US008730813B2

(12) United States Patent
Kitada

(10) Patent No.: US 8,730,813 B2
(45) Date of Patent: May 20, 2014

(54) APPARATUS FOR PERFORMING PACKET-SHAPING ON A PACKET FLOW

(75) Inventor: Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 13/362,354

(22) Filed: Jan. 31, 2012

(65) Prior Publication Data

US 2012/0213078 A1  Aug. 23, 2012

(30) Foreign Application Priority Data

Feb. 23, 2011 (JP) ................... 2011-036571

(51) Int. Cl.
*H04J 1/16* (2006.01)
*H04J 3/14* (2006.01)
(52) U.S. Cl.
USPC ............ 370/236; 370/230; 370/229; 370/235
(58) Field of Classification Search
USPC .............. 370/252, 230.1, 411, 412, 472, 473, 370/474, 230, 235, 241, 248, 352, 395.21, 370/329, 222, 236; 709/217, 219, 226
See application file for complete search history.

(56) References Cited

U.S. PATENT DOCUMENTS

| | | | | |
|---|---|---|---|---|
| 5,982,748 A * | 11/1999 | Yin et al. | ....................... | 370/232 |
| 6,078,919 A * | 6/2000 | Ginzburg et al. | ..................... | 1/1 |
| 6,614,790 B1 * | 9/2003 | Veres et al. | ................. | 370/395.2 |
| 7,680,897 B1 * | 3/2010 | Carter et al. | ................... | 709/217 |
| 8,059,546 B2 * | 11/2011 | Pai et al. | ........................ | 370/236 |
| 2003/0165116 A1 * | 9/2003 | Fallon et al. | ................ | 370/230.1 |
| 2003/0185169 A1 * | 10/2003 | Higgins | ........................ | 370/329 |
| 2005/0249115 A1 * | 11/2005 | Toda et al. | ..................... | 370/229 |
| 2007/0076607 A1 * | 4/2007 | Voit et al. | ...................... | 370/230 |
| 2007/0104103 A1 * | 5/2007 | Howe et al. | ................ | 370/230.1 |
| 2007/0268841 A1 * | 11/2007 | Dube et al. | ..................... | 370/254 |
| 2010/0254462 A1 * | 10/2010 | Friedrich et al. | ........ | 375/240.25 |
| 2010/0274893 A1 * | 10/2010 | Abdelal et al. | ................. | 709/224 |
| 2011/0023080 A1 * | 1/2011 | Drang et al. | ................... | 725/148 |
| 2011/0051604 A1 * | 3/2011 | Nishimura | ..................... | 370/235 |
| 2011/0063978 A1 * | 3/2011 | Hinosugi et al. | .............. | 370/235 |
| 2011/0069619 A1 * | 3/2011 | Voit et al. | ...................... | 370/248 |
| 2011/0085567 A1 * | 4/2011 | Beecroft | ....................... | 370/412 |
| 2011/0116406 A1 * | 5/2011 | Racz et al. | ..................... | 370/252 |

FOREIGN PATENT DOCUMENTS

| | | |
|---|---|---|
| JP | 7-107116 | 4/1995 |
| JP | 11-32055 | 2/1999 |

* cited by examiner

*Primary Examiner* — Abdullah Riyami
(74) *Attorney, Agent, or Firm* — Staas & Halsey LLP

(57) ABSTRACT

A first apparatus receives, at a first transmission rate, packets belonging to a target packet flow on which packet-shaping processing for controlling network traffic is to be performed, and stores the received packets in a first packet buffer. Then, the first apparatus performs first packet-shaping processing on the target packet flow by transmitting, at a second transmission rate, packets that belong to the target packet flow and read out from the first packet buffer. A second apparatus stores packets received from the first apparatus in a second packet buffer. When a shortage of buffer resource for storing packets belonging to the target packet flow occurs in the first packet buffer, the second apparatus performs second packet-shaping processing on the target packet flow by transmitting, at a third transmission rate, packets that belong to the target packet flow and are read out from the second packet buffer.

10 Claims, 24 Drawing Sheets

US 8,730,813 B2

APPARATUS FOR PERFORMING PACKET-SHAPING ON A PACKET FLOW

CROSS-REFERENCE TO RELATED APPLICATION

This application is based upon and claims the benefit of priority of the prior Japanese Patent Application No. 2011-036571, filed on Feb. 23, 2011, the entire contents of which are incorporated herein by reference.

FIELD

The present invention relates to an apparatus for performing packet-shaping on a packet flow.

BACKGROUND

In an information network, an apparatus for transferring a packet, such as a router and a layer 2 switch (L2SW), performs the control of output traffic called "packet-shaping processing".

In the packet-shaping processing, a transmission rate of a packet flow is smoothened by adjusting the intervals of transmitting packets based on a bandwidth contracted with a user so that an actually-used bandwidth does not exceed the contracted bandwidth. In an apparatus that performs the packet-shaping processing, packets are temporarily stored in a queue (logical queue) provided for each of users, read out from the queue, and transmitted from the apparatus at a predetermined transmission rate. Hereinafter, the above predetermined transmission rate will be also expressed as "a shaping rate", and packets on which packet-shaping processing has been performed will be also expresses as "shaped packets". Therefore, "a shaping rate" means a transmission rate at which "shaped packets" are transmitted from the apparatus.

When an output rate at which packets are outputted from the apparatus is higher than an input rate at which packets are inputted to the apparatus, arriving packets are stored in a queue provided for the apparatus. When the length of the queue exceeds a predetermined value called a discard threshold value, a newly arriving packets are discarded without being stored in the queue (this queue management algorithm is called "Tail Drop").

In order to allow a queue to have tolerance to the bursty arrival of packets, a certain queue length of a buffer area may be reserved for each of the queues. However, when the buffer area having a queue length equal to or larger than the discard threshold value is statically reserved for each of user queues, a usage efficiency of the user queues becomes low, causing limitation on the implementation of the user queues.

For this reason, a common buffer scheme is used in general. The common buffer scheme is a scheme in which a common buffer space (pool) is prepared in addition to the buffer spaces used for the individual user queues. When the total size of arriving packets exceeds a buffer space prepared for an individual user queue, a necessary amount of buffer space is dynamically acquired from the common buffer space. This improves the usage efficiency of the user queues, reducing the total size of the user queues to be implemented.

Further, a technique has been proposed in which received data is stored in the common buffer with being sorted by an incoming path via which the received data is received, and the common buffer is used virtually as individual buffers. In addition, another conventional technique has been proposed in which a number N of input buffers and one common buffer are prepared, and when an available space of the common buffer is equal to or larger than a space needed for the number N of packets, a space for storing packets are changed from the input buffers to the common buffer so that a tolerance to the bursty arrival of packets is ensured.

Japanese Laid-open Patent Publication Nos. 11-32055 and 7-107116 disclose the related art.

SUMMARY

According to an aspect of an embodiment, there is provided a communication system for performing packet-shaping on a packet flow. The communication system includes a first and second transmission apparatuses. The first transmission apparatus receives, at a first transmission rate, packets belonging to a target packet flow on which packet-shaping processing for controlling network traffic is to be performed, stores the received packets in a first packet buffer, and performs first packet-shaping processing on the target packet flow by transmitting, at a second transmission rate, packets that belong to the target packet flow and are read out from the first packet buffer. The second transmission apparatus receives, at the second transmission rate, packets that belong to the target packet flow from the first transmission apparatus, and stores the received packets in a second packet buffer. When a shortage of buffer resource available for storing packets belonging to the target packet flow occurs in the first packet buffer, the first transmission apparatus requests the second transmission apparatus to perform second packet-shaping processing on the target packet flow by transmitting a packet-shaping request message including a third transmission rate to the second transmission apparatus. Then, the second transmission apparatus performs the second packet-shaping processing on the target packet flow by transmitting, at the third transmission rate, packets that belong to the target packet flow and are read out from the second packet buffer.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENT

As mentioned abode, according to the common buffer scheme, in order to take advantage of a statistical multiplexing effect, buffers are designed so that the total size of buffer spaces needed for storing packets, in each of queues, to the utmost limit not exceeding the discard threshold value of the each queue, is larger than the size of the common buffer.

However, when a first queue occupies buffer space on a bursty basis within the common buffer, a second queue becomes unable to acquire buffer space from the common buffer due to the shortage of available space of the common buffer. In this case, even when the length of the second queue does not reach the discard threshold value, arrival packets may be discarded without being stored in the second queue.

When a resource (buffer space) for buffering is limited as in the case of the common buffer scheme, interference between queues may occur, and tolerance of the queues to traffic congestion may be reduced. This may increase the rate of discarding packets, thereby reducing the quality of communication.

Hereinafter, embodiments of the present invention will be described with reference to the accompanying drawings.

Figure 1:
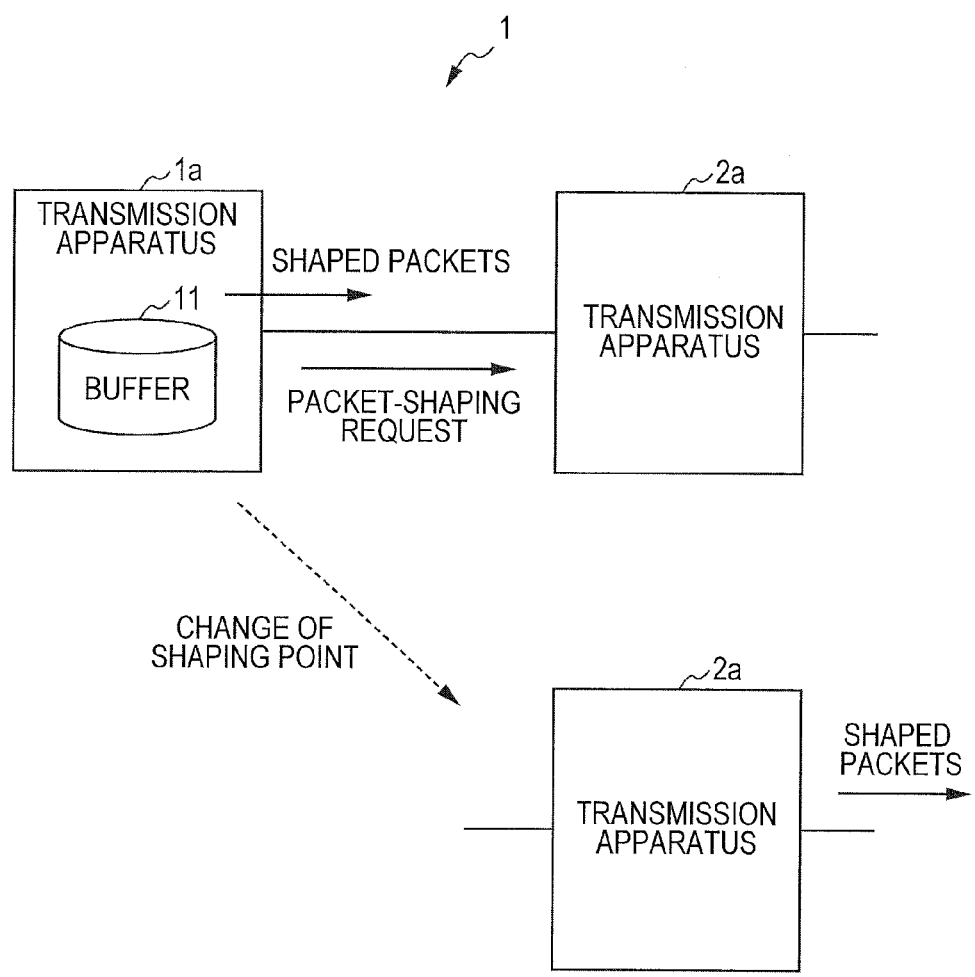
FIG. 1 is a diagram illustrating a configuration example of a communication system, according to an embodiment.

FIG. 1 is a diagram illustrating a configuration example of a communication system, according to an embodiment. A communication system. 1 includes a transmission apparatus 1a (serving as a pre-processing node that will be described later) and a transmission apparatus 2a (serving as a post-processing node that will be described later).

The transmission apparatus 1a includes a buffer 11 for storing packets that have arrived at the transmission apparatus 1a and belong to a predetermined packet flow on which packet-shaping processing for controlling traffic volume is to be performed. Hereinafter, the predetermined packet flow will also be expressed as "a target packet flow". The transmission apparatus 1a performs packet-shaping processing on the target packet flow, by transmitting, at a given shaping rate, packets that belong to the target packet flow and are read out from the buffer 11, to the transmission apparatus 2a, where the given shaping rate means a transmission rate at which the shaped packets are transmitted from the transmission apparatus 1a. In this way, the packet-shaping processing allows packets belonging to the target packet flow to be transmitted from the transmission apparatus 1a at a given shaping rate, regardless of an arrival rate at which the packets have arrived at the transmission apparatus 1a. The transmission apparatus 2a receives the packets transmitted from the transmission apparatus 1a and relays the received packets, for example, to another node in a communication network (not depicted in FIG. 1).

The transmission apparatus 1a may be configured to request, based on a resource-usage state of the buffer 11, the transmission apparatus 2a to perform packet-shaping processing on the target packet flow, where the resource-usage state indicates, for example, a usage state of buffer space for the buffer 11. The transmission apparatus 2a performs the packet-shaping processing on the target packet flow instead of the transmission apparatus 1a or in cooperation with the transmission apparatus 1a.

In this manner, the communication system 1 according to an embodiment may be configured so that a shaping point at which the packet-shaping processing is performed is dynamically changed from the transmission apparatus 1a to the transmission apparatus 2a, based on the resource-usage state of the buffer 11 of the transmission apparatus 1a.

Thus, even when a shortage of resource (for example, a shortage of available buffer space) occurs in the buffer 11 of the transmission apparatus 1a, the packet-shaping processing may be performed by the transmission apparatus 2a on behalf of the transmission apparatus 1a so that the shortage of the resource of the buffer 11 is promptly resolved. This may reduce a loss rate of packets belonging to the target packet flow, thereby improving the communication quality.

Figure 2:
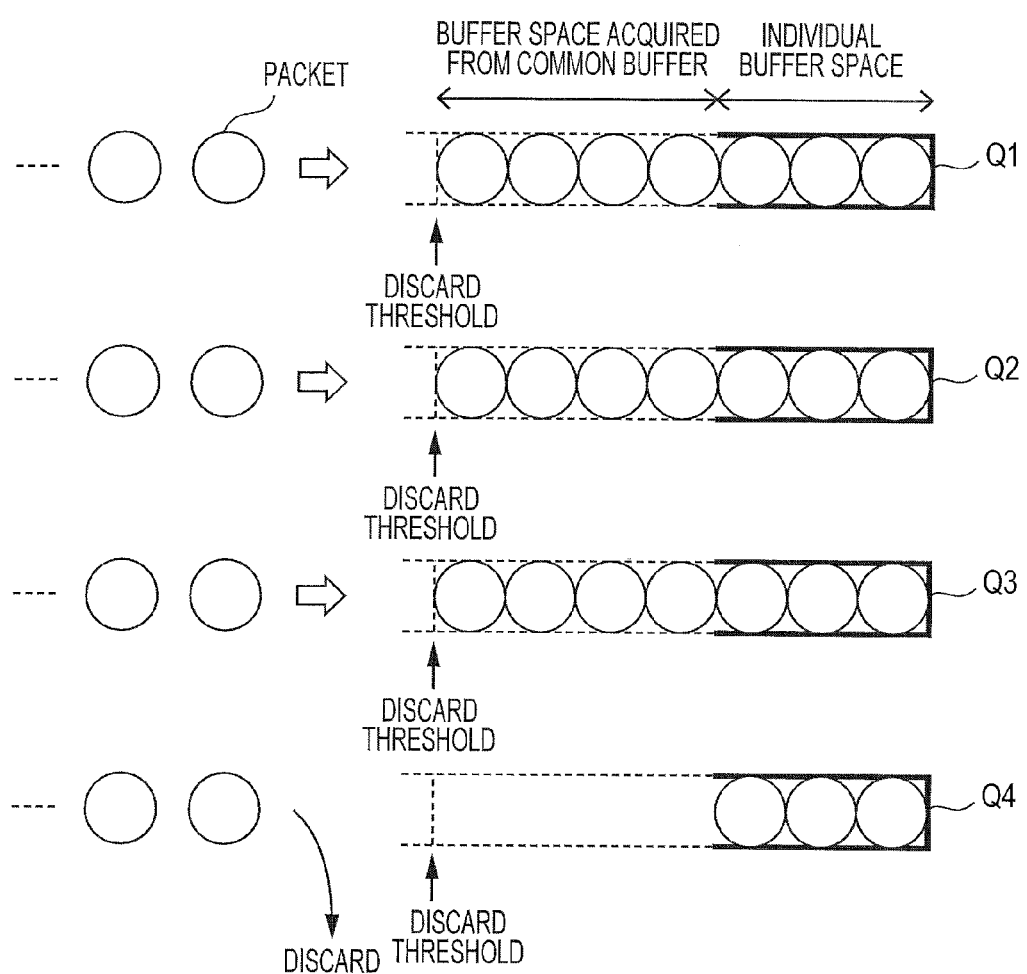
FIG. 2 is a schematic diagram illustrating an example of a common buffer scheme.

FIG. 2 is a schematic diagram illustrating an example of a common buffer scheme. Queues Q1 to Q4 each have a predetermined size of buffer space that is provided in advance, and packets are stored in each queue by using a buffer space that is acquired as needed basis from a common buffer. Here, the queues Q1 to Q4 are configured so that total amount of buffer space, needed for storing packets in each of the queues to the utmost limit not exceeding the discard threshold value of the each queue, is greater than the amount of buffer space of the common buffer.

An arriving packet is queued in one of the queues Q1 to Q4 that is identified by identification information included in the arriving packet, for example, identification information identifying VPN via which the arriving packet is received. Here, it is assumed that the total amount of buffer space needed for storing arriving packets in each of the individual queues Q1 to Q3 has exceeded the predetermined size of the buffer space that is provided in advance for the each queue. Further, it is assumed that the arriving packets are stored in the each queue using buffer space acquired from the common buffer until the total amount of buffer space used for storing the arriving packets reaches the discard threshold value of the each queue.

When the entire buffer space of the common buffer is fully used by the queues Q1 to Q3, a newly arriving packet destined for the queue Q4 is discarded without being stored in the queue Q4 due to the shortage of an available buffer space of the common buffer even though the length of the queue Q4 does not reach the discard threshold value thereof. Thus, according to the common buffer scheme, the interference between individual queues may occur, and tolerance to congested traffic may be reduced, thereby increasing the loss rate of arriving packets.

Meanwhile, when the length of any one of the individual queues exceeds or is going to exceed the discard threshold value, "back pressure" may be applied to a node from which packets destined for the corresponding queue are transmitted so that arrival of packets destined for the corresponding queue is limited. When the back pressure is applied to a transmitting node, the transmitting node halts the sending of packets until the shortage of available buffer space of the corresponding queue is recovered and the corresponding queue becomes able to store a newly arriving packet.

However, for example, in the case where the amount of arriving packets is much larger than the amount of outgoing packets, when there exist packets that have been already stored in a queue, it takes a long time to recover the shortage of buffer space of the queue, or to read out the packets from the queue until the shortage of the buffer space of the queue is recovered. Further, a node (for example, a customer device) from which packets are transmitted may not have a function of being controlled in response to the applied back pressure.

The common buffer scheme is described above as a typical example of a buffer control scheme. However, the aforementioned problem arises not only from the case of using a common buffer scheme but also from the case of performing packet-shaping processing under the conditions where the available buffer resources are limited.

Figure 3:
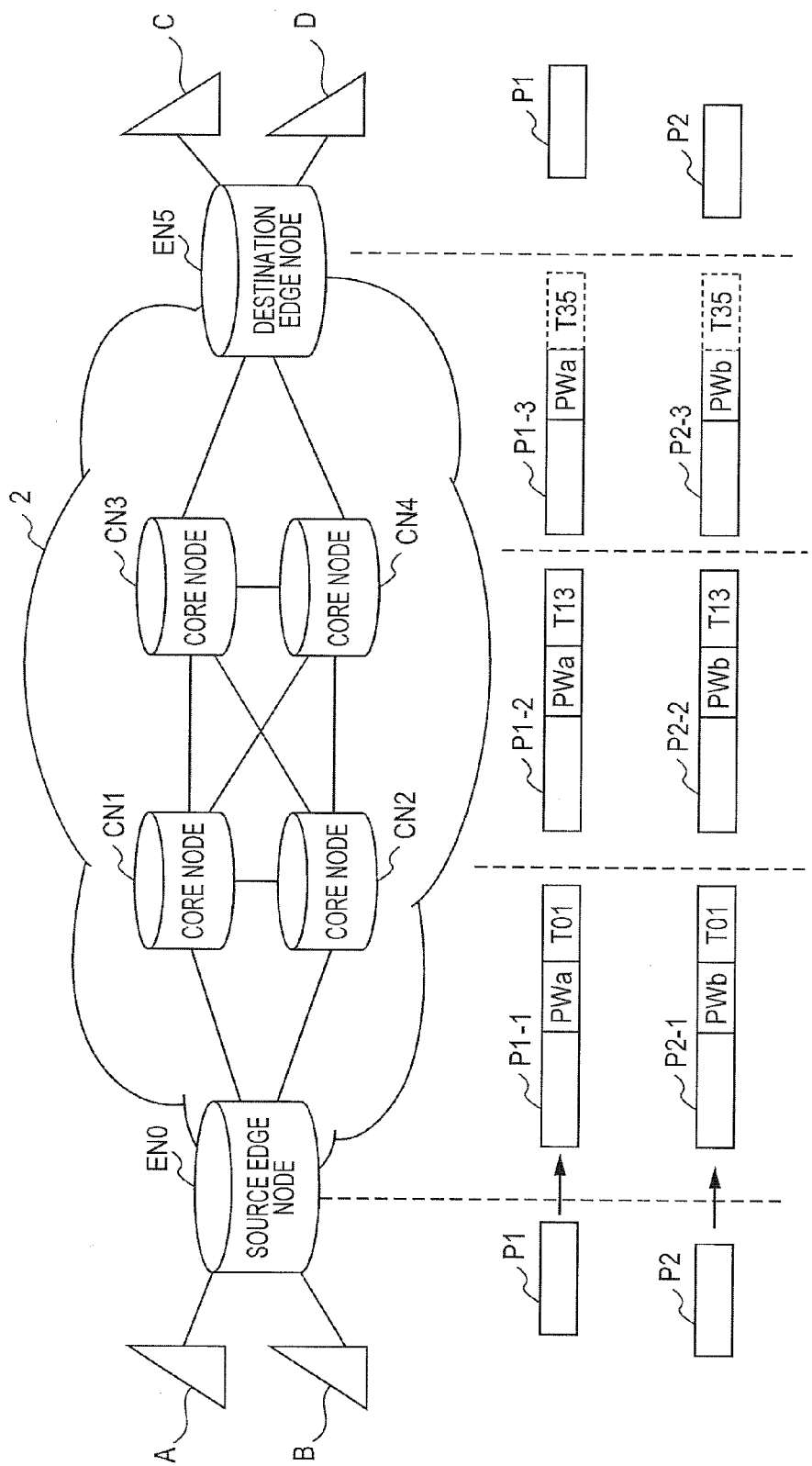
FIG. 3 is a diagram illustrating a configuration example of a communication network, according to an embodiment.

FIG. 3 is a diagram illustrating a configuration example of a communication network, according to an embodiment. As a typical configuration example of the communication network, description will be given of a network 2 that is configured as a multiprotocol label switching-virtual private network (MPLS-VPN).

The network 2 includes a source edge node EN0, a destination edge node EN5 and core nodes CN1 to CN4. The source edge node EN0 is connected to user terminals A, B and the core nodes CN1, CN2. The destination edge node EN5 is connected to user terminals C, D and the core nodes CN3, CN4. The core nodes CN1 to CN4 are connected to each other in a mesh topology.

The source edge node EN0 adds, to a packet received from a user terminal, a pseudo wire (PW) label for identifying a user network (for example, VPN) and a tunnel label for identifying a destination edge node (for example, EN5), and the source edge node EN0 transfers the packet added with the pseudo wire label and the tunnel label to network 2.

For example, the source edge node EN0 adds tunnel label T01 and pseudo wire label PWa to packet P1 transmitted from the user terminal A so as to generate a packet P1-1 including tunnel label T01 and pseudo wire label PWa, and source edge node EN0 transfers the generated packet P1-1 to network 2. Here, pseudo wire label PWx is a user identification label that indicates a virtual private network VPNx. Thus, for example, pseudo wire label PWa indicates virtual private network VPNa. In this example, pseudo wire label PWa indicates that the packet including the pseudo wire label PWa is transmitted from user terminal A arranged in the virtual private network VPNa.

In FIG. 3, tunnel label denoted by "Tx1x2" indicates that a packet including tunnel label "Tx1x2" is to be transferred from node x1 to node x2, where x1 and x2 each indicate one of node numbers 0 to 5 that are assigned to nodes EN0, CN1, CN2, CN3, CN4, and EN5, respectively. For example, the tunnel label T01 indicates transferring a packet from a node #0 (source edge node EN0) to a node #1 (core node CN1).

Source edge node EN0 adds tunnel label T01 and pseudo wire label PWb to packet P2 transmitted from the user terminal B to generate a packet P2-1 including tunnel label T01 and pseudo wire label PWb, and source edge node EN0 transfers the generated packet P2-1 to network 2.

Packets P1-1 and P2-1 arrive at core node CN1. Core node CN1 references only the tunnel labels among the labels included in the packets P1-1 and P2-1, and replaces the referenced tunnel labels with other tunnel labels based on a label table that is signaled to the core node CN1 in advance.

For example, the core node CN1 replaces the tunnel labels T01 of the packets P1-1 and P2-1 with tunnel label T13 to generate packets P1-2 and P2-2, respectively, and transfers the generated packets P1-2 and P2-2 to the core node CN3 that is located on the downstream side of the core node CN1.

Similarly, the core node CN3 receives the packets P1-2 and P2-2, references only the tunnel labels among the labels included in the packets P1-2 and P2-2, and replaces the referenced tunnel labels with other tunnel labels based on a label table signaled to the core node CN3 in advance.

For example, the core node CN3 replaces the tunnel labels T13 of the packets P1-2 and P2-2 with tunnel label T35 to generate packets P1-3 and P2-3, respectively, and transfers the generated packets P1-3 and P2-3 to the destination edge node EN5 that is located on the downstream side of the core node CN3.

The destination edge node EN5 references the pseudo wire labels to identify VPNs, and transfers packets P1 and P2 included in packets P1-3 and P2-3 to the user terminal C and D identified by pseudo wire labels PWa and PWb, respectively. Here, the core nodes CN3 and CN4 that are located on the upstream side of the destination edge node EN5 may be configured to transfer the packets P1-3 and P2-3 after removing the tunnel labels included therein.

Signaling of the tunnel labels may be performed using a known protocol such as Label Distribution Protocol (LDP: RFC3036) or Resource Reservation Protocol-Traffic Engineering (RSVP-TE: RFC3209). The core nodes CN1 to CN4 each have a label table and transfer a packet by replacing the label stored in the packet with another label in accordance with the contents stored in the label table of the each core node.

When using a RSVP-TE, bandwidth resource may be reserved by signaling the labels. In this case, since the reservation of the bandwidth resource is performed so that the reserved bandwidth falls within the predetermined physical bandwidth, the core nodes CN1 to CN4 may stay constantly in a non-congested state.

Therefore, in this case, user traffic, on which packet-shaping processing has been performed by the source edge node EN0 in accordance with the agreement with a user, may be transferred to the destination node EN5 without undergoing packet-shaping processing by the core nodes CN1 to CN4.

Next, an example of operations performed by the communication system 1 is described with reference to FIGS. 4 and 5. In the communication system 1, when available buffer resources are insufficient for performing packet-shaping processing on a target packet flow within a pre-processing node (transmission apparatus 1a), the pre-processing node (transmission apparatus 1a) requests a post-processing node (transmission apparatus 2a) to perform the packet-shaping processing on the target packet flow so that the loss rate of packets is reduced even when the queues of the pre-processing node are in a congested state.

Figure 4:
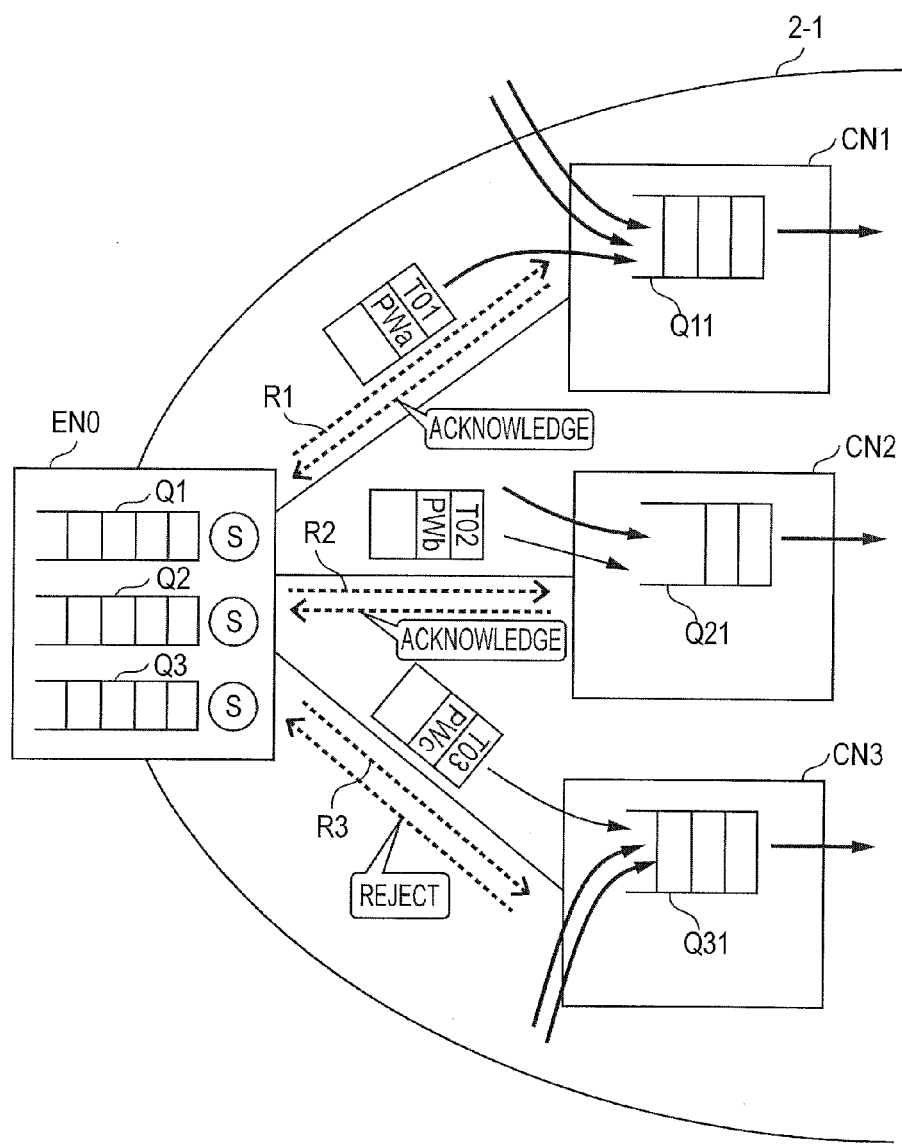
FIG. 4 is a schematic diagram illustrating an operation example in which a pre-processing node requests one or more post-processing nodes to perform packet-shaping processing, according to an embodiment.

FIG. 4 is a schematic diagram illustrating an operation example in which a pre-processing node requests one or more post-processing nodes to perform packet-shaping processing, according to an embodiment.

Figure 5:
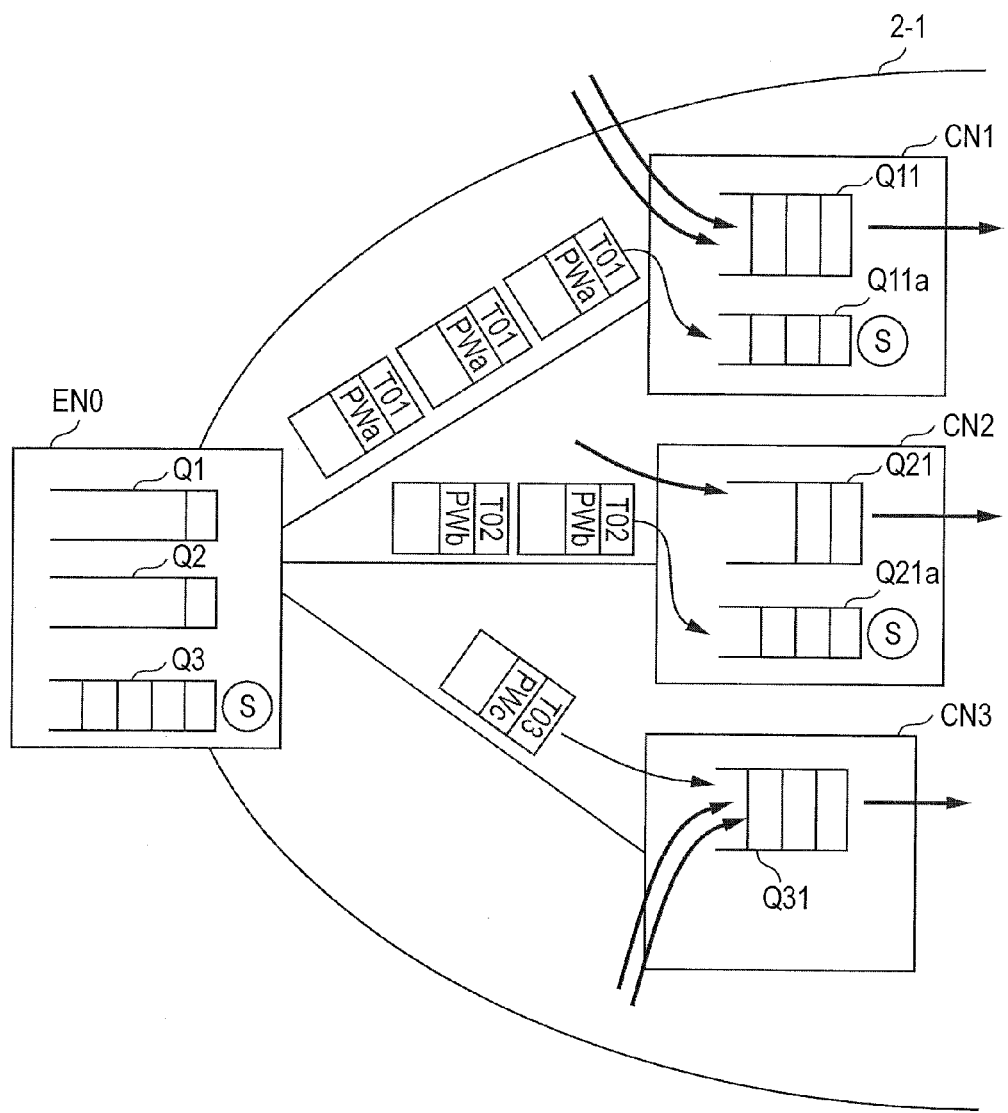
FIG. 5 is a schematic diagram illustrating an operation example in which one or more post-processing nodes perform packet-shaping processing, according to an embodiment.

FIG. 5 is a schematic diagram illustrating an operation example in which one or more post-processing nodes perform packet-shaping processing, according to an embodiment.

In FIGS. 4 and 5, network 2-1 (MPLS-VPN) includes the source edge node EN0 (serving as a pre-processing node) and the core nodes CN1 to CN3 (serving as post-processing nodes), where the source edge node EN0 is connected to the core nodes CN1 to CN3.

The source edge node EN0 has queues Q1 to Q3, while the core nodes CN1 to CN3 have queues Q11, Q21 and Q31, respectively, where a queue in the embodiment means a logical queue. Encircled symbol "S" that is depicted on the output side (the right-hand side) of a queue in FIGS. 4, 5 indicates that packet-shaping processing is being performed on packets stored in the queue.

In the example depicted in FIG. 4, it is assumed that the available buffer spaces of queues Q1 to Q3 are going to be exhausted when source edge node EN0 tries to perform packet-shaping processing on packets stored in the queues Q1 to Q3 at a shaping rate that is determined based on the contracted bandwidth.

In this case, the source edge node EN0 requests the core nodes CN1 to CN3 that are located on the downstream side of the source edge node EN0, to perform packet-shaping processing at predetermined shaping rates. For example, the source edge node EN0 transmits, to the core node CN1, a packet-shaping request message R1 that requests the core node CN1 to perform packet-shaping processing on a target packet flow identified by the tunnel label T01 and the pseudo wire label PWa, at a shaping rate of 100 Mbps.

Further, the source edge node EN0 transmits, to core node CN2, a packet-shaping request message R2 that requests the core node CN2 to perform packet-shaping processing on a target packet flow identified by tunnel label T02 and pseudo wire label PWb, at a shaping rate of 50 Mbps. Furthermore, the source edge node EN0 transmits, to the core node CN3, a packet-shaping request message R3 that requests the core node CN3 to perform packet-shaping processing on a target packet flow identified by tunnel label T03 and pseudo wire label PWc, at a shaping rate of 200 Mbps.

When a core node determines that it is possible to perform packet-shaping processing at the requested shaping rate, the core node performs the packet-shaping processing on the corresponding target packet flow. For example, when the core nodes CN1 and CN2 have buffer resources enough for performing the packet-shaping processing at the requested shaping rates, but the core node CN3 does not have buffer resources enough for performing the packet-shaping processing at the requested shaping rate, the core nodes CN1 and CN2 acknowledge the packet-shaping request messages transmitted from source edge node EN0, while the core node CN3 rejects the packet-shaping request message transmitted from source edge node EN0.

As illustrated in FIG. 5, the core nodes CN1 and CN2 perform the packet-shaping processing requested from source edge node EN0. In this case, the core node CN1 allocates queue Q11a acquired from the existing queue Q11, that is, cuts out a portion of buffer space for the existing queue Q11 and uses the portion as buffer space for the queue Q11a. Then, the core node CN1 performs packet-shaping processing on packets stored in the queue Q11a at the requested shaping rate of 100 Mbps. Hereinafter, a queue that is acquired from the existing queue of the post-processing node and used for storing packets belonging to a target packet flow will be also expressed as "a shaping queue".

In the similar manner, the core node CN2 acquires a shaping queue Q21a from the queue Q21 (or cuts out the shaping queue Q21a from the existing queue Q21), and the core node CN2 performs the packet-shaping processing on packets stored in the acquired shaping queue Q21a at the requested shaping rate of 50 Mbps.

Although a packet-shaping request to the core node CN3 is rejected by the core node CN3, the packet-shaping requests to the core nodes CN1 and CN2 is acknowledged and the requested packet-shaping processing is performed by the core nodes CN1 and CN2. In this way, the shortage of the buffer resource (the buffer space) of the source edge node EN0 is gradually resolved, thereby increasing the amount of the available buffer resource of the source edge node EN0. As a result, the source edge node EN0 becomes able to perform the packet-shaping processing, which was previously requested to the core node CN3 using the packet-shaping request message R3 and rejected by the core node CN3, on the target packet flow identified by the tunnel label T03 and the pseudo wire label PWc at the shaping rate of the 200 Mbps.

As described above, when the buffer resource of the source edge node (functioning as a pre-processing node) becomes exhausted or is going to be exhausted at the time of trying to perform packet-shaping processing on a target packet flow, at least one of the core nodes (functioning as post-processing nodes) may perform the packet-shaping processing instead of the source edge node. In other words, the point of packet-shaping is dynamically changed from the pre-processing node to at least one post-processing node, based on the usage state of the buffer resource of the source edge node.

When it is determined that a post-processing core node has enough buffer resource to perform packet-shaping processing on a target packet flow instead of a pre-processing edge node, the post-processing core node acknowledges the packet-shaping request message transmitted from the source edge node and performs the packet-shaping processing on the designated target packet flow.

As a result, in the source edge node, packets being stored in the queue are read out, and the shortage of the buffer resource of the source edge node is gradually resolved. When the shortage of the buffer resources is resolved, the source edge node cancels the packet-shaping processing that was requested to the post-processing core nodes. Thereafter, the source edge node and the core nodes restore the original operating states before the packet-shaping requests are issued (for example, the point of packet-shaping and the queue allocation are restored).

In this way, when the buffer resource of the source edge node is occupied by bursty traffic, which may be received, for example, in the case where the incoming transmission rate of the source edge node is much higher than the outgoing transmission rate thereof, the source edge node requests the post-processing nodes (the core nodes) to perform packet-shaping processing on a congested target packet flow, where the congested target packet flow means a packet flow including packets stored in a congested queue of the source edge node in which, for example, the queue length exceeds the discard threshold value.

However, if the source edge node unilaterally forces the postprocessing core nodes to perform the packet-shaping processing, the point (node) at which the available buffer resource is exhausted may simply shift from the source edge node to the post-processing core nodes. To avoid this, the source edge node negotiates packet-shaping conditions with at least one of the post-processing core nodes, where the packet-shaping conditions includes identification of a target packet flow on which packet-shaping processing is to be performed (for example, when a MPLS-VPN is used, the target packet flow is identified by a PW label and a tunnel label) and a shaping rate indicating a transmission rate at which the shaped packets are transmitted from the post-processing node. When at least one of the post-processing core nodes acknowledges the shaping conditions, the packet-shaping point is changed from the source edge node to the at least one of the post-processing core nodes.

When the source edge node transmits a packet-shaping request message to the post-processing core node, the post-processing core node determine whether there exist the buffer resource enough for performing the packet-shaping processing, and the post-processing core node rejects the packet-shaping request message when the post-processing core node does not have enough buffer resource. Examples of operations for performing the negotiation procedure will be described later.

Next, description will be given of the configurations of pre-processing and post-processing nodes that are included in the communication system 1.

Figure 6:
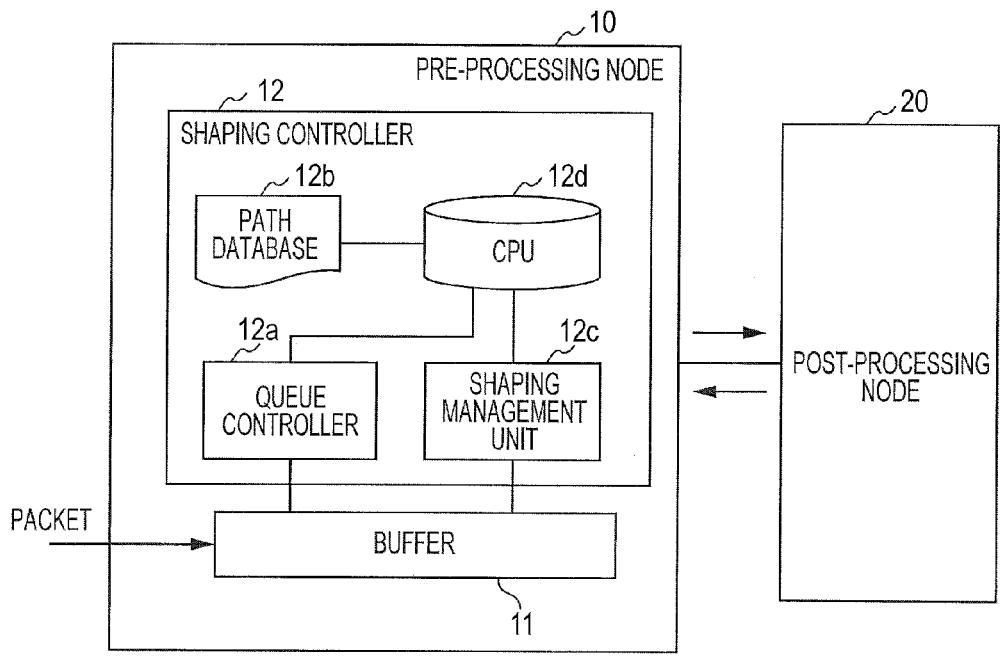
FIG. 6 is a diagram illustrating a configuration example of a pre-processing node, according to an embodiment.

FIG. 6 is a diagram illustrating a configuration example of a pre-processing node, according to an embodiment. A pre-processing node 10 corresponds to the transmission apparatus 1*a* depicted in FIG. 1 and the source edge node EN0 depicted in FIGS. 3 to 5.

The pre-processing node 10 is connected to a post-processing node 20 and includes the buffer 11 and a shaping controller 12. The shaping controller 12 reads packets from the buffer 11 and performs packet-shaping processing on the read packets at a given shaping rate.

The buffer 11 buffers packets that have arrived at the pre-processing node 10. The shaping controller 12 requests a post-processing node to perform packet-shaping processing on a target packet flow, based on the resource usage state of the buffer 11, and cause the post-processing node to perform the packet-shaping processing on the target packet flow, for example, instead of the pre-processing node 10 or in cooperation with the pre-processing node 10.

The shaping controller 12 includes a queue controller 12*a*, a path database 12*b*, a shaping management unit 12*c* and a central processing unit (CPU) 12*d*.

The queue controller 12*a* manages the resource of the buffer 11 by monitoring a resource usage state of the buffer 11, for example, monitoring the lengths of queues stored in the buffer 11. The path database 12*b* stores and manages information on a packet flow in association with a path. The shaping management unit 12*c* sets and changes a shaping rate of a target packet flow on which packet-shaping processing is to be performed. The CPU 12*d* includes a processor, a memory, and an interface (IF), and provides an instruction to perform entire control of the constituent elements and to perform predetermined control of each of the constituent elements. In addition, the CPU 12*d* communicates with other nodes.

Figure 7:
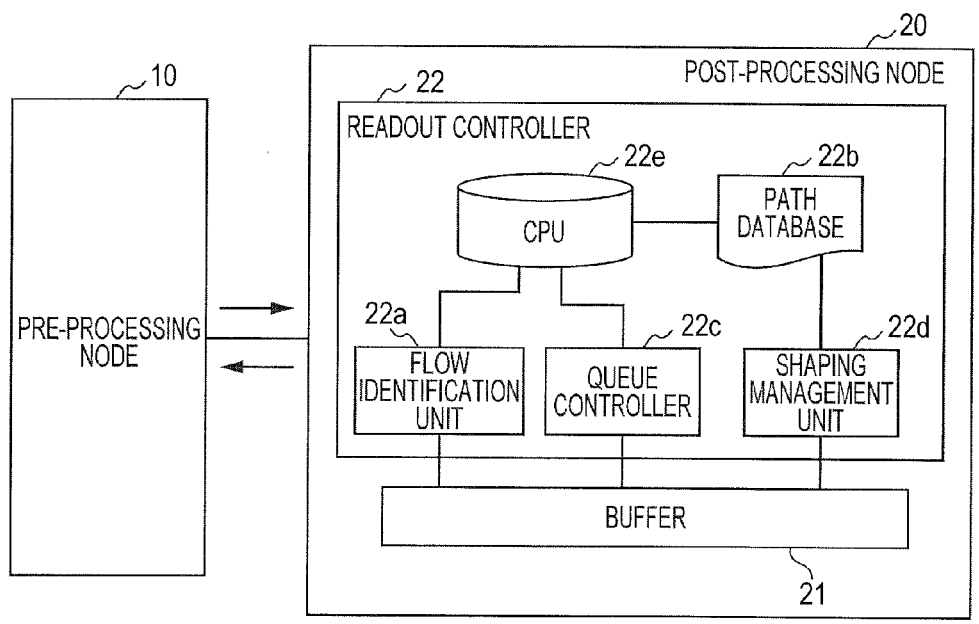
FIG. 7 is a diagram illustrating a configuration example of a post-processing node, according to an embodiment.

FIG. 7 is a diagram illustrating a configuration example of a post-processing node, according to an embodiment. A post-processing node 20 corresponds to the transmission apparatus 2*a* depicted in FIG. 1 and the core nodes depicted in FIGS. 3 to 5. The post-processing node 20 is connected to the pre-processing node 10, and includes a buffer 21 and a readout controller 22. The readout controller 22 reads out packets from the buffer 21 and outputs the read packets to another node in a communication network (not depicted in FIG. 7).

The buffer 21 buffers packets that are transmitted from pre-processing node 10 or other nodes (not depicted in FIG. 7). When the readout controller 22 receives, from a pre-processing node, a packet-shaping request message, the readout controller 22 acquires buffer space from the buffer 21, and uses the acquired buffer space for storing a shaping queue in which packets belonging to the target packet flow are stored. Thereafter, when receiving packets belonging to the target packet flow, the readout controller 22 stores the received packets in the shaping queue. Then, the readout controller 22 performs packet-shaping processing on the target packet flow instead of the pre-processing node 10, by transmitting, at a given shaping rate, packets that are read out from the shaping queue to another node (not depicted in FIG. 7).

The readout controller 22 includes a flow identification unit 22*a*, a path database 22*b*, a queue controller 22*c*, a shaping management unit 22*d*, and a CPU 22*e*. The flow identification unit 22*a* identifies a packet flow including an arriving packet. The path database 22*b* stores and manages information on a packet flow in association with a path.

The queue controller 22*c* manages the resource (for example, buffer space) of the buffer 21. In addition, the queue controller 22*c* monitors the resource usage state of the buffer 21, for example, monitoring the lengths of queues stored in the buffer 21, and changes queue allocation. The shaping management unit 22*d* sets a shaping rate for a shaping queue on which packet-shaping processing is to be performed. The CPU 22*e* includes a processor, a memory, and an IF, and provides an instruction to perform entire control of the constituent elements and to perform predetermined control of each of the constituent elements. In addition, the CPU 22*e* communicates with another node (a pre-processing node).

Figure 8:
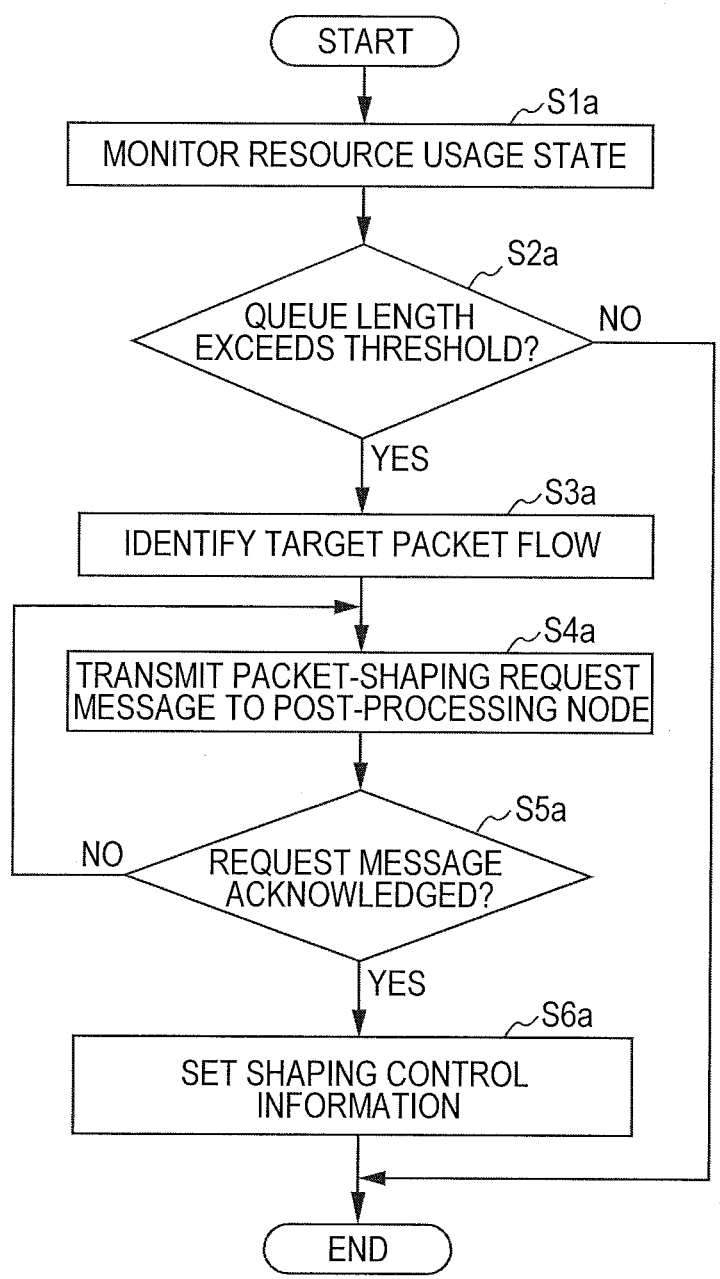
FIG. 8 is a diagram illustrating an example of an operational flowchart performed by a pre-processing node, according to an embodiment.

FIG. 8 is a diagram illustrating an example of an operational flowchart performed by a pre-processing node, according to an embodiment. FIG. 8 illustrates an operational flowchart performed when the pre-processing node 10 requests the post-processing node 20 to perform packet-shaping processing.

In operation S1*a*, the CPU 12*d* instructs the queue controller 12*a* to monitor the resources of buffer 11, and the queue controller 12a monitors the resource usage state of buffer 11 in accordance with the instruction.

In operation S2a, the CPU 12d determines, based on the result of monitoring the resource usage state of the buffer 11, whether there exists a queue whose current length is going to exceed the discard threshold value or not. When there exists a queue whose current length going to exceed the discard threshold value, the process proceeds to operation S3a, and when there exist no queues whose current lengths going to exceed the discard threshold values, the process is terminated.

In operation S3a, the CPU 12d identifies, as a target packet flow, a packet flow including the packets stored in the queue whose current length is going to exceed the discard threshold value, and the CPU 12d extracts information on the identified target packet flow from the path database 12b.

In operation S4a, the CPU 12d transmits, to the post-processing node 20, a packet-shaping request message for requesting the post-processing node 20 to perform packet-shaping processing on the identified target packet flow.

In operation S5a, the CPU 12d determines whether the post-processing node 20 has acknowledged the packet-shaping request or not. When the post-processing node 20 has acknowledged the packet-shaping request message, the process proceeds to operation S6a. When the post-processing node 20 has not acknowledged the packet-shaping request message, the process returns to operation S4a. Here, when the CPU 12d fails to receive the acknowledgement of the packet-shaping request from the post-processing node 20 even after transmitting predetermined times the packet-shaping request message to the post-processing node 20, the process is terminated.

In operation S6a, the CPU 12d instructs the shaping management unit 12c to change the setting for shaping control information flag, where the shaping control information includes a shaping flag and a current shaping rate. The shaping flag indicates whether packet-shaping processing is to be performed on a target packet flow or not, where the setting of "ON" value means that the packet-shaping processing is performed on the target packet flow, and the setting of "OFF" value means that the packet-shaping processing is not performed on the target packet flow. The current shaping rate indicates a shaping rate at which the packet-shaping processing is currently being performed on the target packet flow. For example, the shaping management unit 12c of the pre-processing node 10 changes the setting of the shaping flag for the target packet flow from "ON" value to "OFF" value when the post-processing node 20 performs packet-shaping processing on the target packet flow instead of the pre-processing node 10. Meanwhile, when the post-processing node 20 performs packet-shaping processing on the target packet flow in cooperation with the pre-processing node 10, for example, the shaping management unit 12c of the pre-processing node 10 sets, to the current shaping rate, a shaping rate at which the pre-processing node 10 performs the packet-shaping processing on the target packet flow in cooperation with the post-processing node 20.

Figure 9:
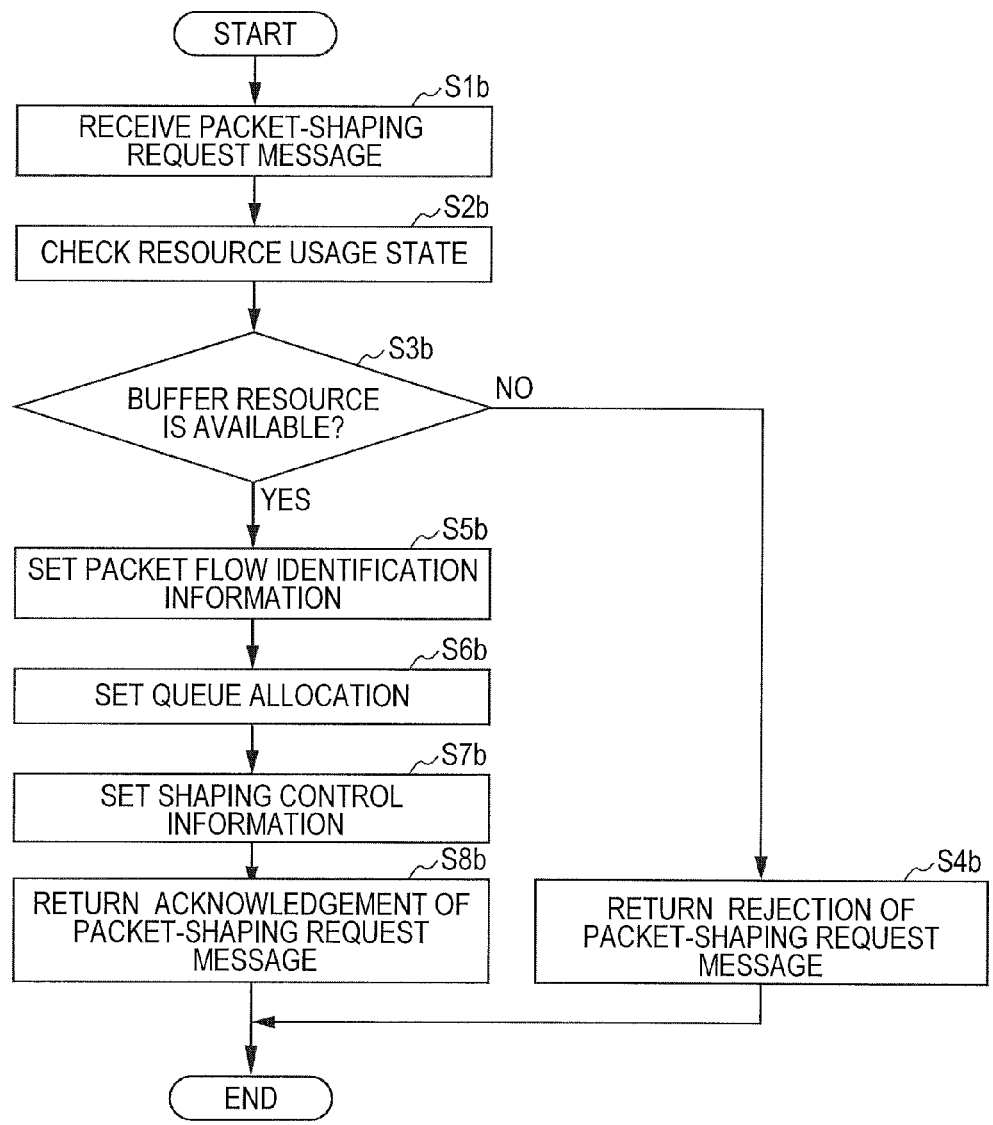
FIG. 9 is a diagram illustrating an example of an operational flowchart performed by a post-processing node, according to an embodiment.

FIG. 9 is a diagram illustrating an example of an operational flowchart performed by a post-processing node, according to an embodiment. FIG. 9 illustrates an operational flowchart performed by the post-processing node when the pre-processing node 10 requests the post-processing node 20 to perform packet-shaping processing.

In operation S1b, the CPU 22e receives a packet-shaping request message from the pre-processing node 10.

In operation S2b, the CPU 22e instructs the queue controller 22c to check the resources (for example, buffer space) of the buffer 21, and the queue controller 22c checks the resource usage state of the buffer 21, for example, the lengths of queues stored in the buffer 21 in accordance with the instruction.

In operation S3b, the CPU 22e determines, based on the result of checking the resources of the buffer 21, whether there exist an available buffer resource left in the buffer 21 or not. When there exist the available buffer resource in the buffer 21 (YES in operation S3b), the process proceeds to operation S5b. When there exist no available buffer resource left in the buffer 21 (NO in operation S3b), the process proceeds to operation S4b.

In operation S4b, the CPU 22e transmits, to the pre-processing node 10, a response message indicating that the post-processing node 20 has rejected the packet-shaping request message, and the process is terminated.

In operation S5b, the CPU 22e instructs the flow identification unit 22a to set target packet flow identification information identifying a target packet flow on which packet-shaping processing is to be performed. Then, the flow identification unit 22a sets the target packet flow identification information based on information included in the received packet-shaping request message, in accordance with the instruction.

In operation S6b, the CPU 22e instructs the queue controller 22c to change the setting for the allocation of queues, and the queue controller 22c allocates a shaping queue for storing packets included in the target packet flow by acquiring the shaping queue from the buffer 21.

In operation S7b, the CPU 22e instructs the shaping management unit 22d to set shaping control information including a shaping flag and a current shaping rate. The shaping flag indicates whether packet-shaping processing is to be performed on the target packet flow or not, where the setting of "ON" value means that the packet-shaping processing is performed on the target packet flow, and the setting of "OFF" value means that the packet-shaping processing is not performed on the target packet flow. The current shaping rate indicates a shaping rate at which the packet-shaping processing is currently being performed on the target packet flow. In this case, the shaping management unit 22d sets "ON" value to the shaping flag, and sets, to the current shaping rate, the value included in the packet-shaping request message to the shaping rate.

In operation S8b, the CPU 22e transmits, to the pre-processing node 10, a response message indicating that the post-processing node 20 has acknowledged the packet-shaping request message transmitted from the pre-processing node 10.

Figure 10:
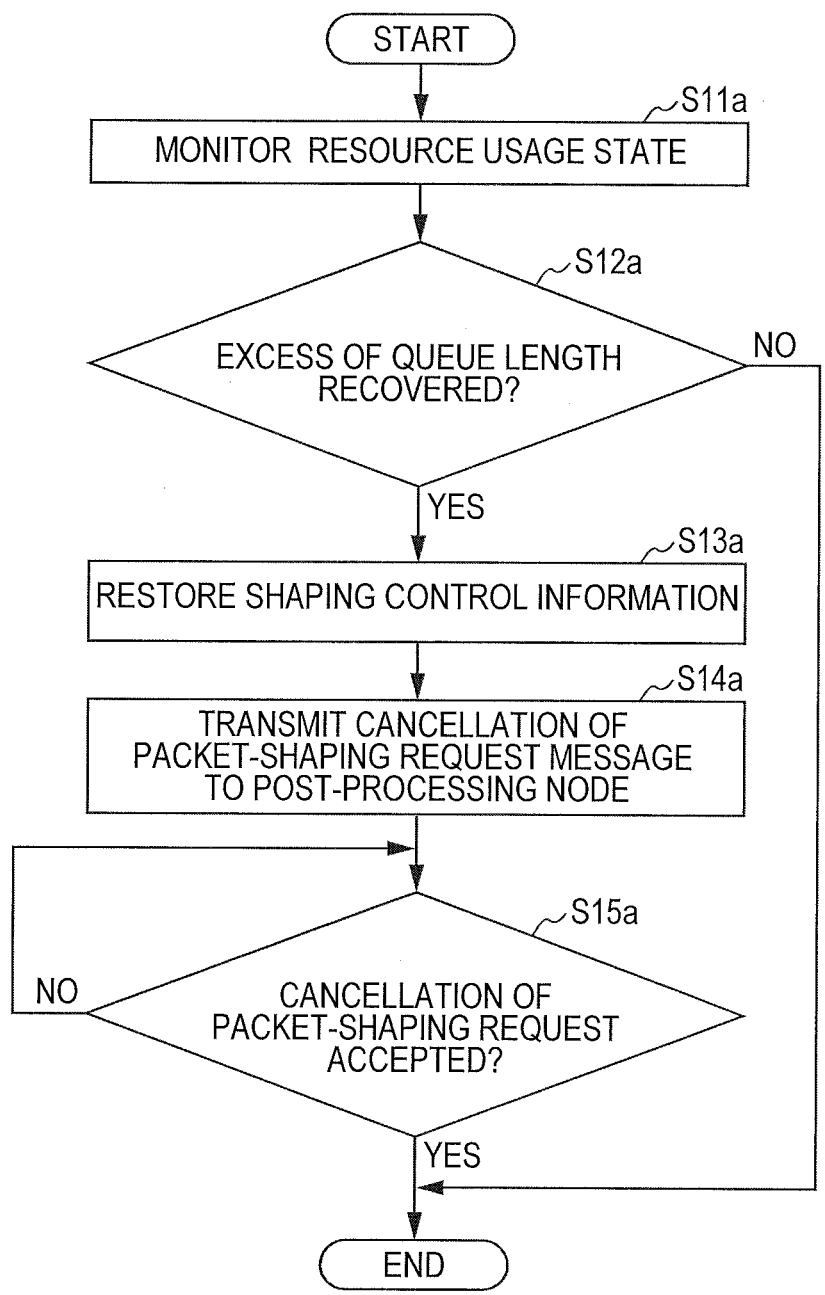
FIG. 10 is a diagram illustrating an example of an operational flowchart performed by a pre-processing node, according to an embodiment.

FIG. 10 is a diagram illustrating an example of an operational flowchart performed by a pre-processing node, according to an embodiment. FIG. 10 illustrates an operational flowchart performed by the pre-processing node when the pre-processing node cancels the packet-shaping request message that was previously transmitted to the post-processing node.

In operation S11a, the CPU 12d instructs the queue controller 12a to monitor the resource usage state of the buffer 11, and the queue controller 12a monitors, as the resource usage state of the buffer 11, the length of queues stored in the buffer 11 in accordance with the instruction.

In operation S12a, the CPU 12d determines, based on the result of monitoring the resource usage state of the buffer 11, whether the length of a queue storing packets belonging to the target packet flow is reduced to a value equal to or smaller than the discard threshold value or not, that is, whether the excess of the queue length is recovered or not. When the excess of the queue length is recovered (YES in operation S12a), the process proceeds to operation S13a, and otherwise (NO in operation S13b) the process is terminated.

In operation S13a, the CPU 12d instructs the shaping management unit 12c to restore the shaping control information including a shaping flag and a current shaping, and the shaping management unit 12c restores the shaping control information by setting, to the shaping flag, the original value "ON" and by restoring the current shaping rate to the original shaping rate.

In operation S14a, the CPU 12d transmits, to the post-processing node 20, a cancel message indicating cancellation of the packet-shaping request message that was issued previously.

In operation S15a, the CPU 12d waits for receiving, from the post-processing node 20, a response message indicating that the packet-shaping request message has been cancelled. When the CPU 12d receives the response message indicating that the packet-shaping request message has been cancelled (YES in operation S15a), the process is terminated.

Figure 11:
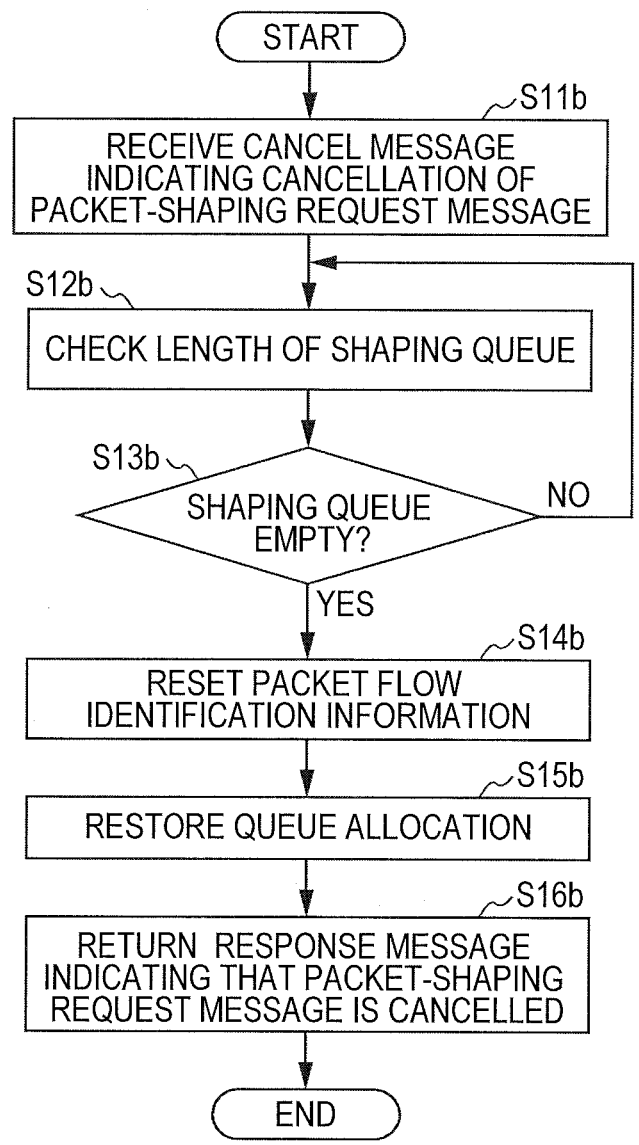
FIG. 11 is a diagram illustrating an example of an operational flowchart performed by a post-processing node, according to an embodiment.

FIG. 11 is a diagram illustrating an example of an operational flowchart performed by a post-processing node, according to an embodiment. FIG. 11 illustrates an operational flowchart performed by the post-processing node when the post-processing node receives a cancel massage requesting the cancelation of the packet-shaping request message issued previously.

In operation S11b, the CPU 22e receives, from the pre-processing node 10, a cancel message indicating the cancellation of the packet-shaping request message that was previously transmitted from the pre-processing node 10.

In operation S12b, the CPU 22e instructs the queue controller 22c to check the length of the shaping queue storing packets belonging to the target packet flow on which the packet-shaping is being performed, and the queue controller 22c checks the length of the shaping queue according to the instruction.

In operation S13b, the CPU 22e determines, based on the result of checking the length of the shaping queue, whether the shaping queue is empty or not. When the shaping queue is empty (YES in operation S13b), the process proceeds to operation S14b, and otherwise (NO in operation S13b) the process returns to operation S12b so that the CPU 22e waits until the shaping queue becomes empty.

In operation S14b, the CPU 22e instructs the flow identification unit 22a to reset target packet flow identification information identifying the target packet flow on which the packet-shaping processing was performed. Then, the flow identification unit 22a set the target packet flow identification information at "OFF" value in accordance with the instruction.

In operation S15b, the CPU 22e instructs the queue controller 22c to change the setting for a queue allocation, and the queue controller 22c restore the queue allocation to the original queue allocation by returning the buffer space used for the shaping queue to the buffer 21.

In operation S16b, the CPU 22e transmits, to the pre-processing node 10, a response message indicating that the packet-shaping request message has been cancelled in the post-processing node 20.

Figure 12:
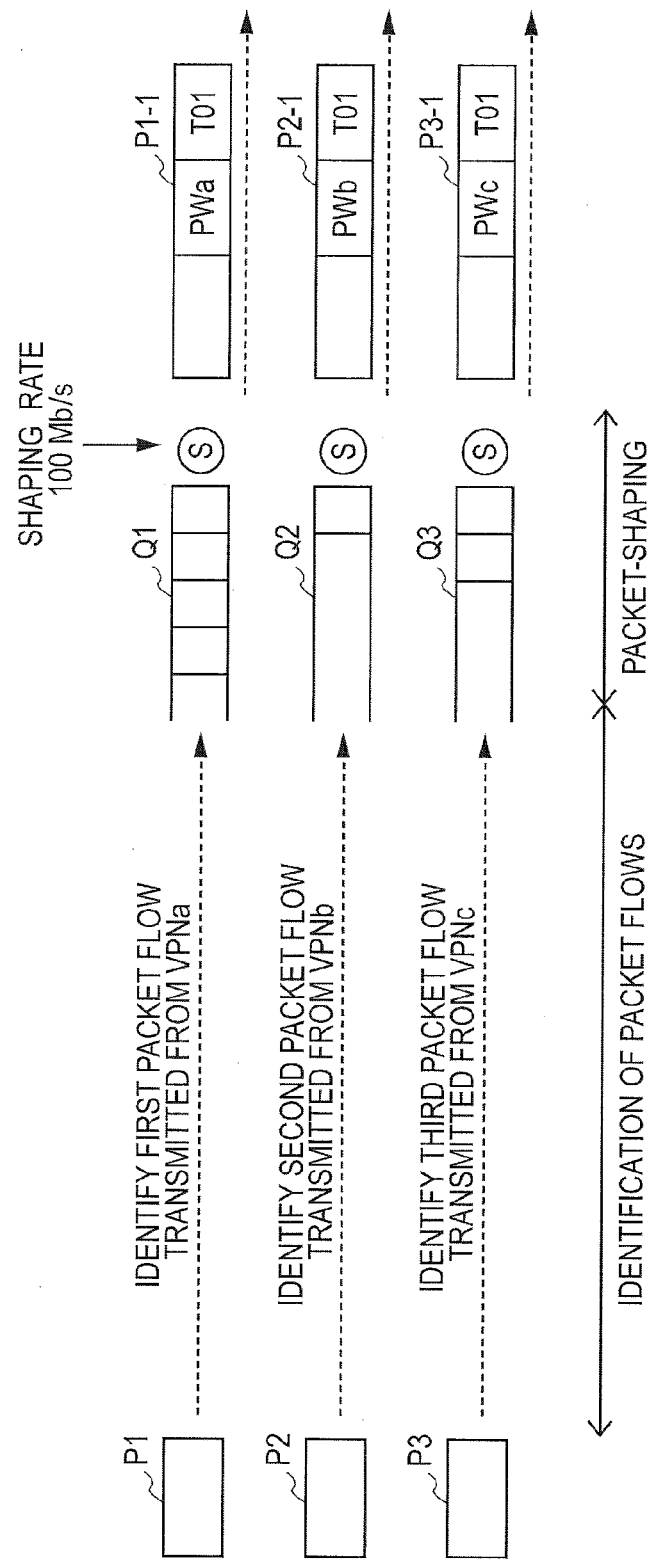
FIG. 12 is a schematic diagram illustrating an example of a resource usage state of a pre-processing node before transmitting a packet-shaping request to a post-processing node, according to an embodiment.

FIG. 12 is a schematic diagram illustrating an example of a resource usage state of a pre-processing node before transmitting a packet-shaping request to a post-processing node, according to an embodiment.

The pre-processing node 10, upon receiving a packet (for example, P1, P2, or P3), determines a packet flow to which the received packet belongs, for example, by identifying an input port or a VLAN via which the packet is received. For example, the pre-processing node 10 determines that packet P1 received via virtual private network VPNa belongs to a first packet flow, packet P2 received via VPNb belongs to a second packet flow, and packet P3 received via VPNc belongs to a third packet flow.

When the queues Q1 to Q3 correspond to the first, second, and third packet flows, respectively, packet P1 transmitted from virtual private network VPNa is stored in the queue Q1, and the packet P1 undergoes packet-shaping processing at a given shaping rate (of, for example, 100 Mbps).

Similarly, packet P2 transmitted from virtual private network VPNb is stored in the queue Q2, and the packet P2 undergoes packet-shaping processing at a given shaping rate of 100 Mbps. Further, packet P3 transmitted from virtual private network VPNc is stored in the queue Q3, and the packet P3 undergoes packet-shaping processing at a given shaping rate of 100 Mbps. FIG. 12 illustrates resource usage states of queues Q1 to Q3 in which a considerable number of packets are staying in the queue Q1.

When packet P1 goes out of the queue Q1, packet P1-1 is generated by adding the tunnel label T01 and the pseudo wire label PWa to the packet P1 based on the label table, and the generated packet P1-1 is outputted from the queue Q1 as illustrated in FIG. 12.

In the similar manner, when packet P2 goes out of the queue Q2, packet P2-1 is generated by adding the tunnel label T01 and the pseudo wire label PWb to the packet P2 based on the label table, and the generated packet P2-1 is outputted from Q2 as illustrated in FIG. 12. Further, when packet P3 goes out of the queue Q3, packet P3-1 is generated by adding the tunnel label T01 and the pseudo wire label PWc to the packet P3 based on the label table, and the generated packet P3-1 is outputted from Q3 as illustrated in FIG. 12.

Figure 13:
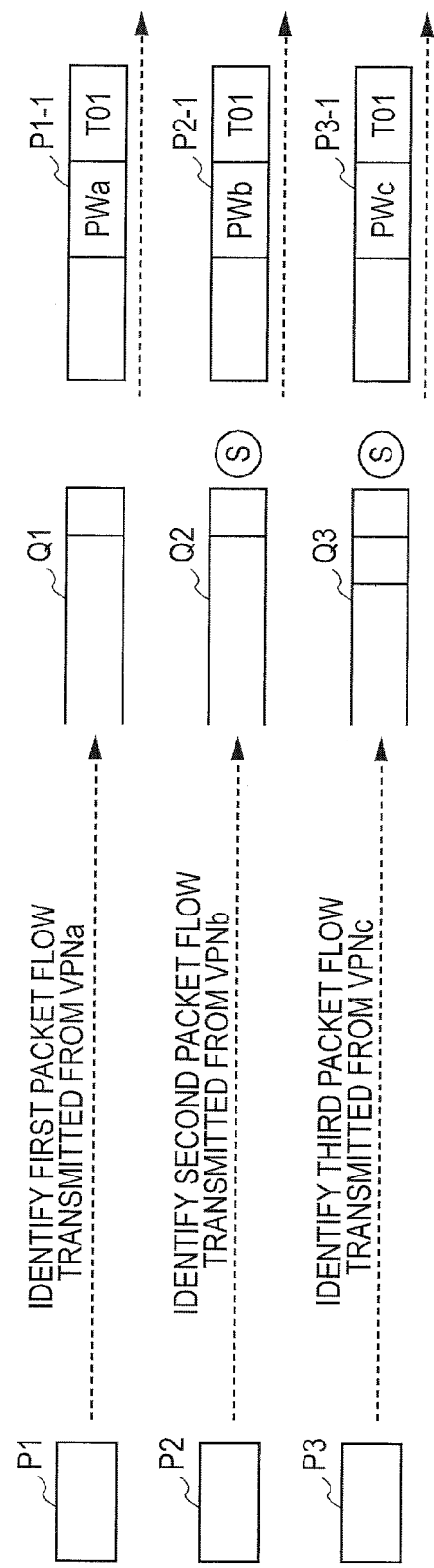
FIG. 13 is a schematic diagram illustrating an example of a resource usage state of a pre-processing node after transmitting a packet-shaping request to a post-processing node, according to an embodiment.

FIG. 13 is a schematic diagram illustrating an example of a resource usage state of a pre-processing node after transmitting a packet-shaping request message to a post-processing node, according to an embodiment. FIG. 13 illustrates the case in which the first packet flow that is transmitted from VPNa and identified by pseudo wire label "PWa" and tunnel label "T01" (as illustrated in FIG. 12) is selected as a target packet flow on which packet-shaping processing is to be performed, and the packets that were staying in the queue Q1 as depicted in FIG. 12 have been outputted from the queue Q1 after the post-processing node 20 performs packet-shaping processing on the first packet flow in response to the packet-shaping request message transmitted from the pre-processing node.

In the above example, the packets are stored in the corresponding queue immediately after the target packet flow is identified. However, traffic policing, in which whether a bandwidth being used is within the contracted bandwidth or not is monitored and packets are discarded when the bandwidth being used exceeds the contracted bandwidth, may be performed on the target packet flow before packets included in the target packet flow are stored in the corresponding queue.

Figure 14:
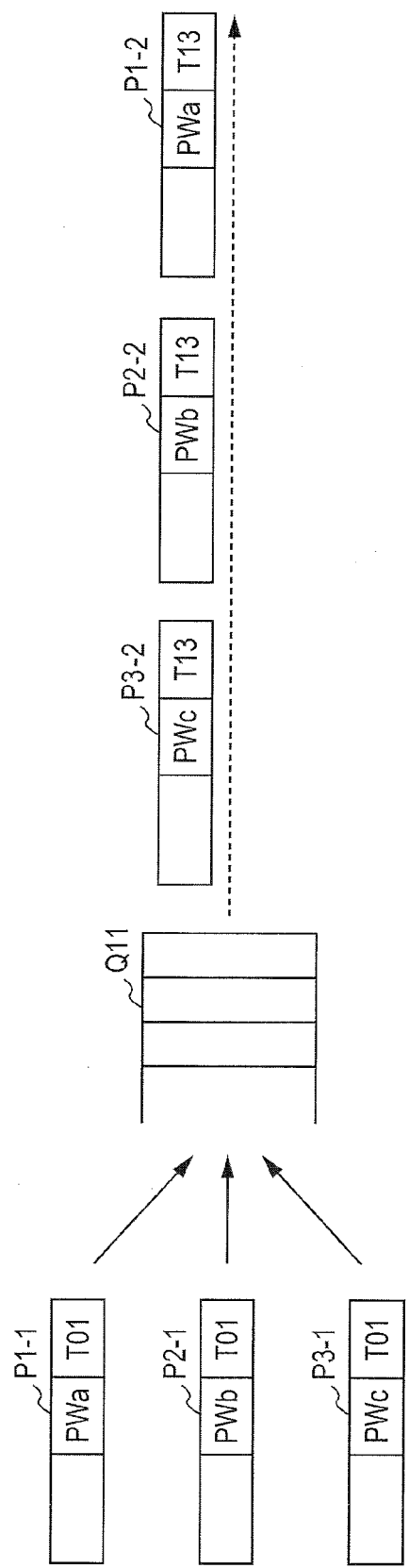
FIG. 14 is a schematic diagram illustrating an example of queue allocation of a post-processing node before receiving a packet-shaping request message from a pre-processing node, according to an embodiment.

FIG. 14 is a schematic diagram illustrating an example of queue allocation of a post-processing node before receiving a packet-shaping request message from a pre-processing node, according to an embodiment.

The post-processing node 20 receives packets P1-1, P2-1 and P3-1. Before receiving a packet-shaping request message from pre-processing node 10, the post-processing node 20 identifies packets having tunnel label T01 as the packets belonging to same packet flow, and queues the packets P1-1, P2-1, and P3-1 in queue Q11.

In addition, when the packets are read from the queue Q11, the post-processing node 20 removes the tunnel labels T01 from the packets P1-1, P2-1 and P3-1, and generates packets P1-2, P2-2 and P3-2, respectively, for example, by adding the tunnel label T13 used by a next-hop node on the downstream side of the post-processing node 20, to the packets P1-1, P2-1 and P3-1. Then, the post-processing node 20 outputs the generated packets P1-2, P2-2 and P3-2 from the queue Q11 as depicted in FIG. 14.

Figure 15:
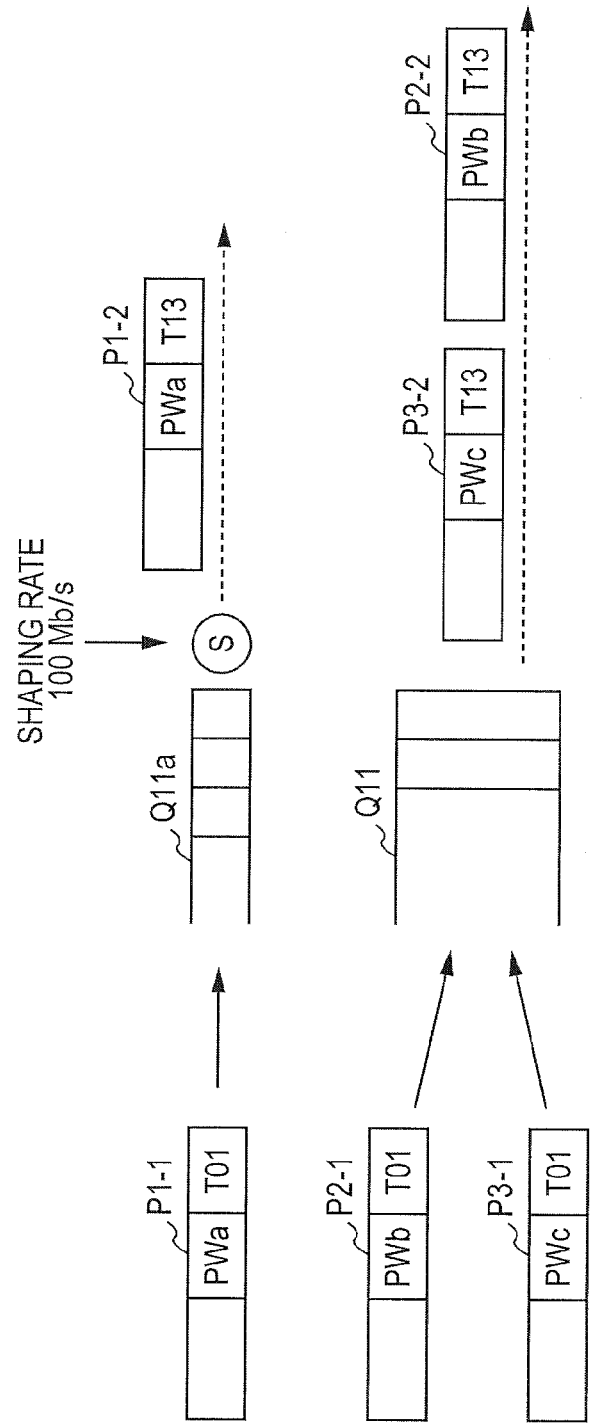
FIG. 15 is a schematic diagram illustrating an example of queue allocation of a post-processing node after receiving a packet-shaping request message from a pre-processing node, according to an embodiment.

FIG. 15 is a schematic diagram illustrating an example of queue allocation of a post-processing node after receiving a packet-shaping request message from a pre-processing node, according to an embodiment. Post-processing node 20 identifies a packet flow by referring only to a tunnel label included in the received packet before acknowledging the packet-shaping request message received from the pre-processing node 10. However, after the post-processing node 20 has acknowledged the packet-shaping request message, the post-processing node 20 identifies a target packet flow on which the packet-shaping is to be performed, by referring to a pseudo wire label included in the received packet shaping request message in addition to the tunnel label, and allocates a shaping queue different from the queues used when the packet-shaping is not performed, to the target packet flow. For example, a packet flow including packets having pseudo wire label PWa and tunnel label T01 is identified as a target packet flow, and allocated to queue Q11a that is different from queue Q11, and the queue Q11a is used as a shaping queue on which the packet-shaping processing is to be performed, as depicted in FIG. 15.

The post-processing node 20 performs packet-shaping processing on packets stored in the shaping queue Q11a at a given shaping rate (for example, 100 Mbps) that is requested by the pre-processing node 10, and transfers the shaped packets on which the packet shaping processing has been performed, to a next-hop node located on the downstream side of the node 20. Meanwhile, the post-processing node 20 transfers packets that include the same tunnel label but include a pseudo wire label different from that included in the packet belonging to the target packet flow, using queues other than the shaping queue by referring to only tunnel labels.

Next, a negotiation of a shaping rate that is performed when a pre-processing node requests a post-processing node to perform packet-shaping processing will be described. In the example described above, when the pre-processing node 10 requests the post-processing node 20 to perform packet-shaping processing, the pre-processing node 10 transmits packets included in the target packet flow to the post-processing node 20 without performing packet-shaping processing on the target packet flow within the pre-processing node 10.

In this case, since the pre-processing node 10 transmits packets included in the target packet flow at the same rate as the incoming transmission rate at which the packets arrive at the pre-processing node 10, the post-processing node 20 may turn into an congested state. To deal with this problem, pre-processing node 10 may be configured to share a total shaping rate needed for performing packet-shaping processing on a target packet flow with post-processing node 20, without requesting the post-processing node 20 to perform packet-shaping processing at the total shaping rate, and request the post-processing node 20 to perform packet-shaping processing at a reduced shaping rate that is determined by negotiating with the post-processing node 20.

Figure 16:
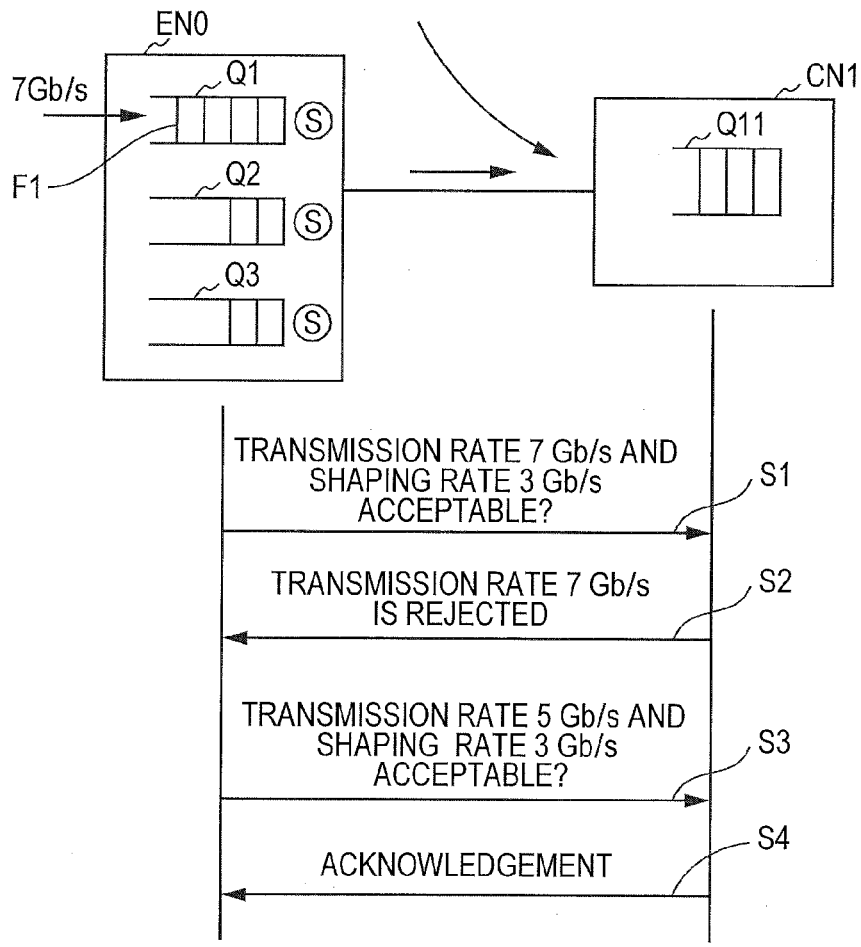
FIG. 16 is a diagram illustrating an example of a negotiation procedure for negotiating a shaping rate between a pre-processing node and a post-processing node, according to an embodiment.

FIG. 16 is a diagram illustrating an example of a negotiation procedure for negotiating a shaping rate between a pre-processing node and a post-processing node, according to an embodiment. In the example of FIG. 16, node EN0 (a pre-processing node) and node CN1 (a post-processing node) are connected to each other, where the node EN0 includes queues Q1 to Q3 and the node CN1 includes queue Q11.

Here, it is assumed that the node EN0 is currently performing packet-shaping processing on packets stored in the queues Q1, Q2, and Q3 at shaping rates of 3 Gbps, 2 Gbps, and 1 Gbps, respectively.

In this case, when a packet flow (hereinafter referred to as packet flow F1) is input to the queue Q1 at a transmission rate of 7 Gbps and the buffer resources of the queue Q1 is going to be exhausted, the following negotiation procedure is performed.

In operation S1, the node EN0 transmits to the node CN1 a packet-shaping request message for requesting the node CN1 to perform packet-shaping processing on target packet flow F1. Here, the packet-shaping request message includes, as parameter information, a transmission rate at which the node EN0 transmits packets included in the target packet flow F1 to the node CN1, and a shaping rate at which the shaped packets of the target packet flow F1 are outputted from the node CN1. In this case, for example, the parameter information includes a transmission rate of 7 Gbps and a shaping rate of 3 Gbps.

In operation S2, it is assumed that, since the node CN1 also receives another packet flow transmitted from a node other than the node EN0 (not depicted in FIG. 16), the node CN1 determines that the volume of the target packet flow exceeds an acceptable capacity of the queue Q11 if the node EN0 transmits the target packet flow F1 to the node CN1 at the transmission rate of 7 Gbps. Therefore, the node CN1 notifies the node EN0 of the fact that the node CN1 is unable to receive the target packet flow F1 at a transmission rate of 7 Gbps.

In operation S3, the node EN0 changes the parameter information of the packet-shaping request message so that the changed packet-shaping request message includes the parameter information indicating that the node EN0 transmits the packet flow F1 at a transmission rate of 5 Gbps and requests the node CN1 to perform the packet-shaping processing on the target packet flow F1 at a shaping rate of 3 Gbps.

In operation S4, assuming that the node CN1 is able to receive the target packet flow F1 at a transmission rate of 5 Gbps and perform packet-shaping processing on the target packet flow F1 at a shaping rate of 3 Gbps, the node CN1 returns, to the node EN0, a response message indicating that the node CN1 has acknowledged the packet-shaping request message transmitted in operation S3.

Figure 17:
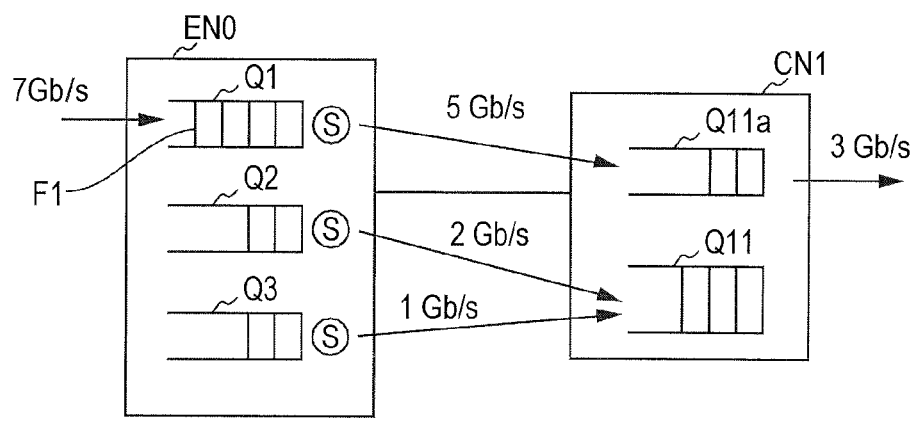
FIG. 17 is a diagram illustrating an example of queue allocations when a packet-shaping point is changed from a pre-processing node to a post-processing node, according to an embodiment.

FIG. 17 is a diagram illustrating an example of queue allocations when a packet-shaping point is changed from a pre-processing node to a post-processing node, according to an embodiment. The node CN1 stores, in the queue Q11a, packets that belong to the target packet flow F1 and are transmitted from the node EN0 at a transmission rate of 5 Gbps, and performs packet-shaping processing on the packets stored in the queue Q11a by transmitting the shaped packets belonging to the target packet flow F1 at a shaping rate of 3 Gbps.

As mentioned above, when the node EN0 requests the node CN1 to perform packet-shaping processing, the node EN0 negotiate a transmission rate and a shaping rate that are used for performing the packet-shaping processing, where the transmission rate means an incoming transmission rate at which the node CN1 receives the target packet flow from the node EN0 and a shaping rate means an outgoing transmission rate at which the shaped packets are transmitted from node CN1, so that the shortage of buffer resource of the node EN0 is recovered without causing the node CN1 to turn into a congested state. After completion of the above negotiation, the node EN0 transmits the target packet flow to the node CN1 at the negotiated transmission rate. In this way, a packet-shaping point (meaning a node at which the packet-shaping processing is to be performed) may be effectively shifted from the node EN0 to the node CN1 without causing the node CN1 to turn into a congested state.

Figure 18:
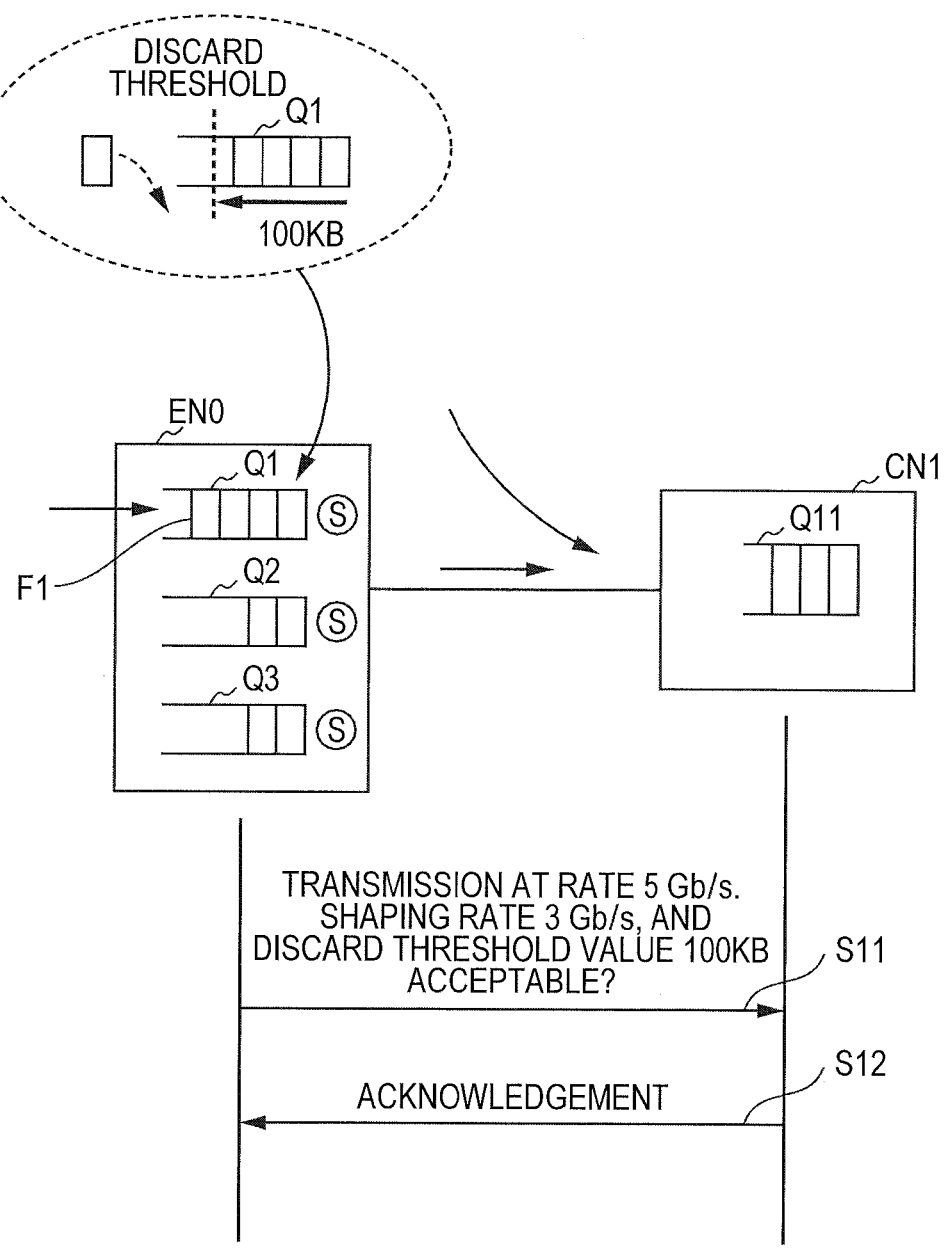
FIG. 18 is a diagram illustrating an example of a negotiation procedure for negotiating a discard threshold value, according to an embodiment.

FIG. 18 is a diagram illustrating an example of a negotiation procedure for negotiating a discard threshold value, according to an embodiment. The node EN0 (a pre-processing node) and the node CN1 (a post-processing node) negotiate a discard threshold value indicating a queue length needed for storing packets belonging to a target packet flow, and the negotiated discard threshold value is set for a shaping queue used for performing packet-shaping processing in the post-processing node. Here, it is assumed that the length of queue Q1 of the node EN0 illustrated in FIG. 16 is 100 KB (kilobytes).

In operation S11, the node EN0 transmits, to the node CN1, a packet-shaping request message including, as parameter information, a discard threshold value in addition to transmission and shaping rates so that the node CN1 set the discard threshold value to a shaping queue Q11 of the node CN1. In the example of FIG. 18, the parameter information includes, as a discard threshold value, 100 KB that is equal to the length of the queue Q1 of the node EN0, in addition to the transmission rate 5 Gbps and the shaping rate 3 Gbps so that the shaped packets belonging to the target packet flow F1 is outputted from the node CN1 at the shaping rate of 3 Gbps.

In operation S12, when the node CN1 is able to perform the packet-shaping processing on the target packet flow F1 in accordance with the parameter information included in the packet-shaping request message received in operation S11, the node CN1 returns a response message indicating that the node CN1 has acknowledged the packet-shaping request message, to the node EN0.

In this way, the node EN0 and the node CN1 negotiate the discard threshold value indicating the length of a shaping queue used for performing the packet-shaping processing on the target packet flow in the node CN1, when the node EN0 transmits the packet-shaping request message to the node CN1, so that the shaping queue of the node CN1 has the same discard threshold as the queue of the node EN0. This allows the node CN1 to have the same tolerance to bursty arrival of packets as the node EN0. Here, as a unit of the discard threshold value, for example, a byte length or the number of packets may be used.

Figure 19:
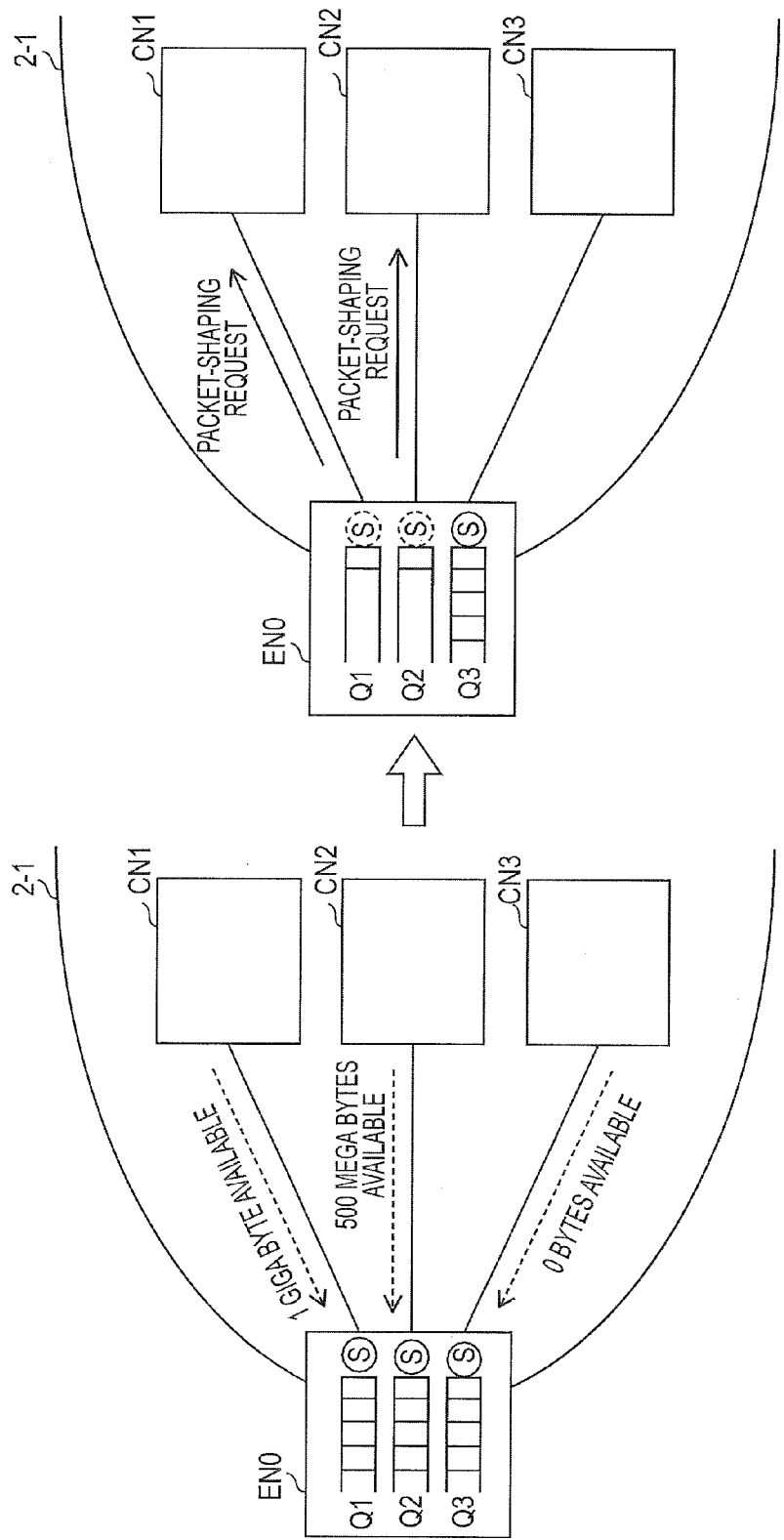
FIG. 19 is a schematic diagram illustrating an example of an advertisement of buffer resources available for post-processing nodes, according to an embodiment.

FIG. 19 is a schematic diagram illustrating an example of an advertisement of buffer resources available for post-processing nodes, according to an embodiment. Here, network 2-1 includes the node EN0 and the nodes CN1 to CN3, where the node EN0 is connected to the nodes CN1 to CN3, and the node EN0 includes the queues Q1 to Q3.

The nodes CN1 to CN3 periodically notify the node EN0 of information on resource usage states of the nodes CN1 to CN3. For example, the node CN1 notifies the node EN0 of the fact that current available buffer space of the node CN1 is 1 Gbyte, the node CN2 notifies the node EN0 of the fact that current available buffer space of the node CN2 is 500 Mbytes, and the node CN3 notifies the node EN0 of the fact that current available buffer space of the node CN3 is 0 bytes.

The node EN0 receives the information on the resource usage states of the nodes CN1 to CN3, and determines which post-processing node is able to perform packet-shaping processing on a target packet flow. In this example, the node EN0 requests the node CN1 to perform packet-shaping processing on packet flow F1 queued in the queue Q1, and requests the node CN2 to perform packet-shaping processing on packet flow F2 queued in the queue Q2. In addition, in this example, since the node CN3 does not have an available buffer resource, the node EN0 does not request the node CN3 to perform packet-shaping processing.

Since the post-processing nodes periodically notify the pre-processing node of information on the resource usage states thereof, the pre-processing node is able to recognizes the resource usage state of each of the post-processing nodes. Thus, the pre-processing node is able to transmit a packet-shaping request message to only a post-processing node that is available for performing packet-shaping processing. Therefore, the packet-shaping request message is not rejected, and the pre-processing node is able to efficiently request the post-processing nodes to perform the packet-shaping processing.

Figure 20:
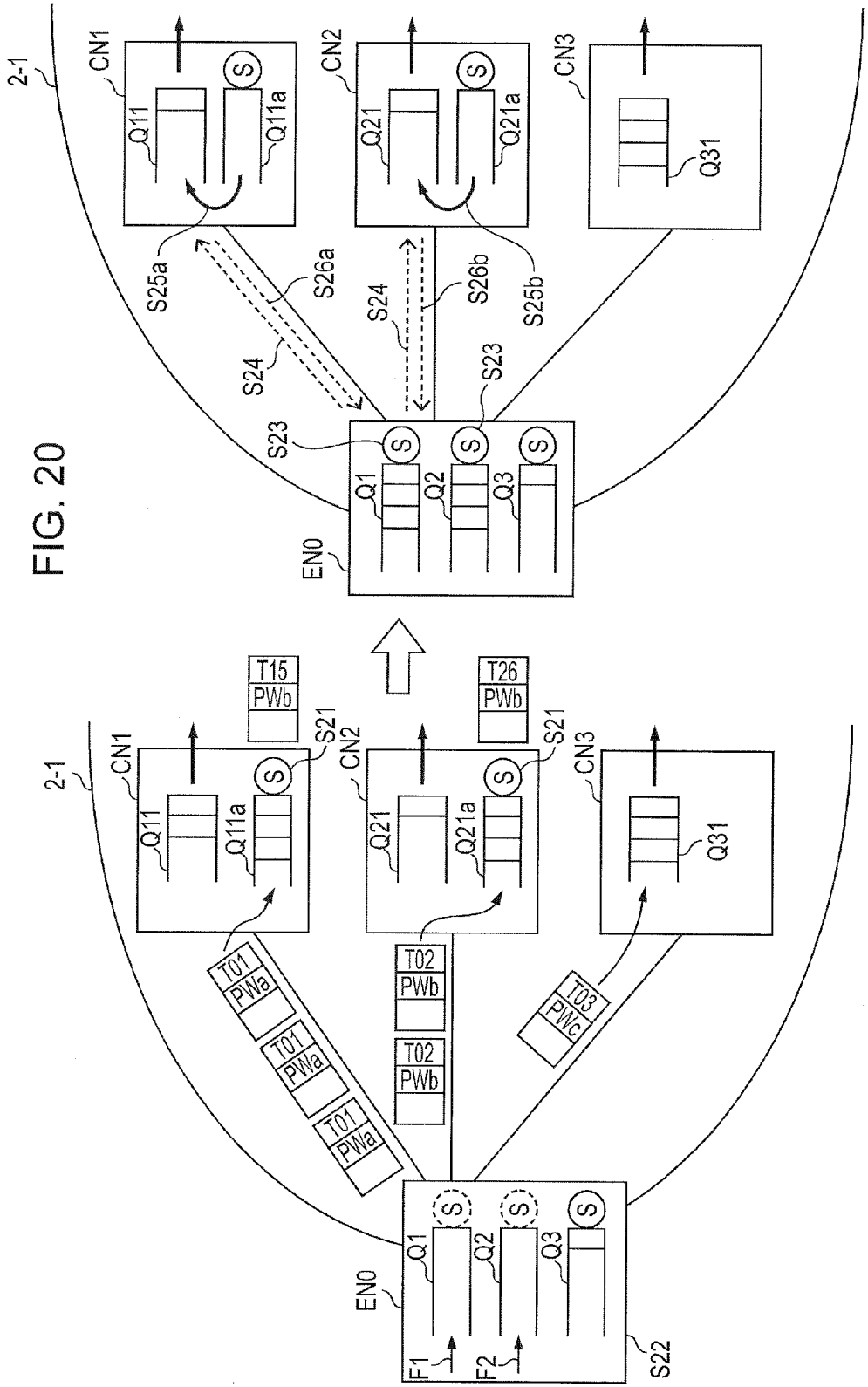
FIG. 20 is a schematic diagram illustrating an example of a procedure for cancelling a packet-shaping request, according to an embodiment.

FIG. 20 is a schematic diagram illustrating an example of a procedure for cancelling a packet-shaping request message, according to an embodiment. As mentioned above, when a shaping point is shifted from the pre-processing node to at least one of the post-processing nodes, the shortage of the available buffer resource of the pre-processing node is gradually resolved. Thereafter, when the shortage of the available buffer resource of the pre-processing node is resolved, the packet-shaping point is restored to the pre-processing node.

In operation S21, after the packet-shaping point has been changed from the node EN0 to the node CN1, the node CN1 performs packet-shaping processing on the packet flow F1 that has been previously queued in the queue Q1 of the node EN0 and is currently queued in the shaping queue Q11a of the node CN1. Similarly, the node CN2 performs packet-shaping processing on the packet flow F2 that was previously queued in the queue Q2 of the node EN0 and is currently queued in the shaping queue Q21a of the node CN2.

In operation S22, shortages of buffer resources of the queues Q1 and Q2 of the node EN0 are resolved.

In operation S23, the node EN0 restarts packet-shaping processing on the packet flows queued in the queues Q1 and Q2.

In operation S24, the node EN0 notifies the nodes CN1 and CN2 of cancellation of the packet-shaping request messages by transmitting cancel messages to the nodes CN1 and CN2.

In operation S25a, when the node CN1 receives the cancel message indicating the cancellation of the packet-shaping request message, the node CN1 waits until the queue Q11a becomes empty. When the queue Q11a has become empty, the node CN1 switches a queue for handling the packet flow F1 from Q11a to Q11 so as to restore the original queue allocation.

In operation S25b, when the node CN2 receives the cancel message indicating the cancellation of the packet-shaping request message, the node CN2 waits until the queue Q21a becomes empty. When the queue q21a has become empty, the node CN2 switches a queue for handling the packet flow F2 from Q21a to Q21 so as to restore the original queue allocation.

In operation S26a, the node CN1 transmits, to the node EN0, a response message indicating that packet-shaping process has been terminated.

In operation S26b, the node CN2 transmits, to the node EN0, a response message indicating that packet-shaping request message is cancelled.

In this way, when the shortage of the buffer resources of the node EN0 is resolved, the node EN0 notifies the node CN1 of cancel request for cancelling the packet-shaping request message so that the node CN1 terminates the packet-shaping processing. This allows a system to quickly restore the original communication state and change the operational state thereof to a normal operational state.

In operation S25a of the above example, if the node CN1 switches a queue for handling the target packet flow from queue Q11a, on which the packet-shaping processing is being performed, to the original queue Q11 immediately after the node CN1 receives the cancel request message for cancelling the packet-shaping request message, the order of outputting packets belonging to packet flow F1 may be reversed. For example, when a packet belonging to the target packet flow is read out from the original queue Q11 before another packet belonging to the target packet flow is read out from the shaping queue Q11a, the order of the outputting the packets belonging to the same packet flow F1 may be reversed. The same holds true for node CN2.

For this reason, the nodes CN1 and CN2 each transmits, to the node EN0, a response messages indicating that packet-shaping request message is cancelled after the shaping queues Q11a and Q21a become empty, respectively.

Further, the communication system 1 may be configured so that when the shaping queue of the post-processing nodes takes a long time to become empty after the pre-processing node restarts the packet-shaping, the post-processing node applies a back-pressure to the pre-processing node so that the pre-processing node temporarily stops transmitting packets to the post-processing node.

Figure 21:
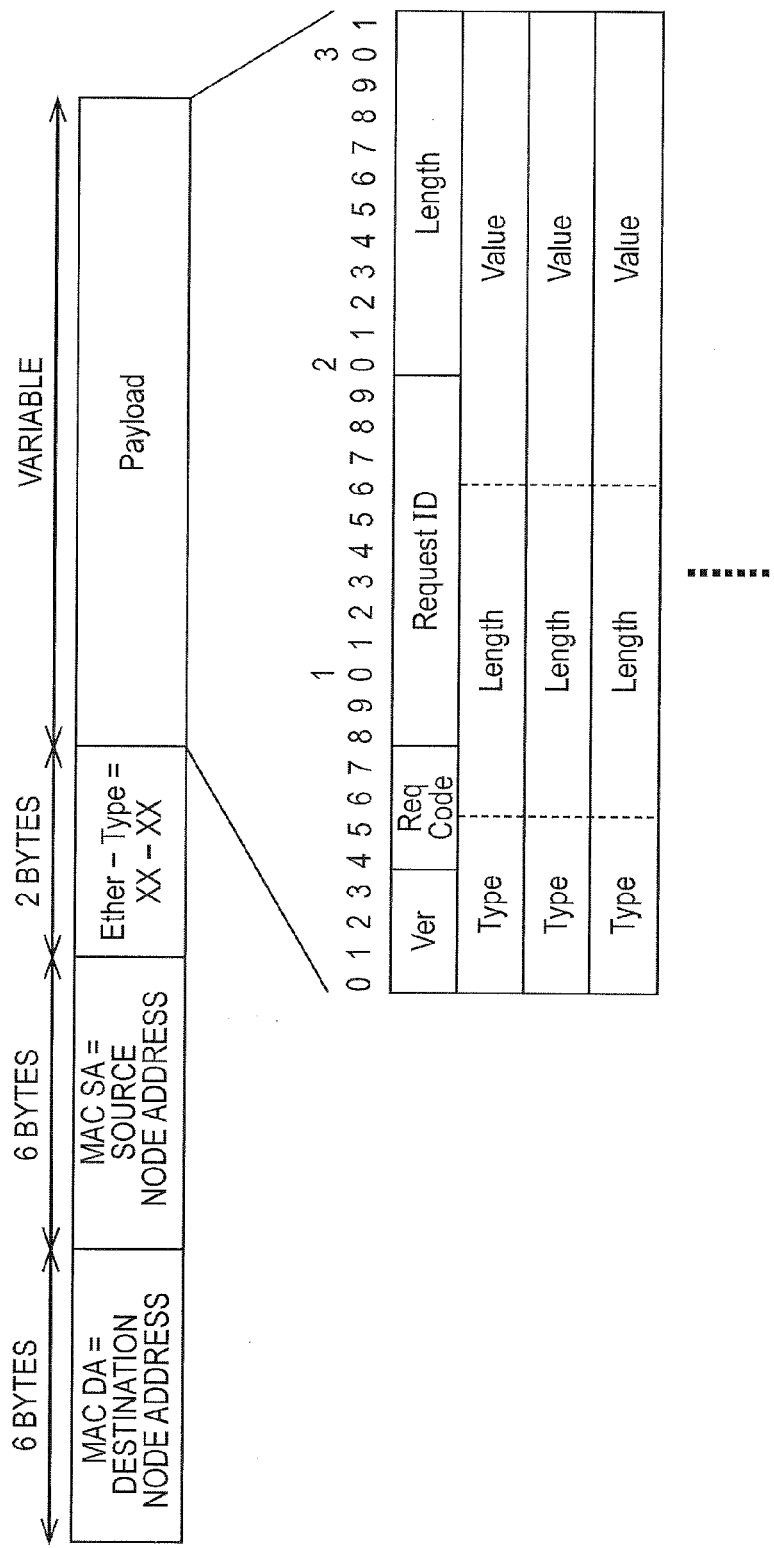
FIG. 21 is a diagram illustrating an example of a packet format used for a negotiation procedure when performing packet-shaping processing, according to an embodiment.

FIG. 21 is a diagram illustrating an example of a packet format used for a negotiation procedure when performing packet-shaping processing, according to an embodiment. FIG. 21 illustrates an example in which the packet format is implemented on an Ethernet frame. The packet format may also be implemented on an Internet Protocol (IP) stack or a Transmission Control Protocol/User Datagram Protocol (TCP/IP) stack.

The packet format includes a 6-byte field specifying a media access control-destination address (MAC-DA: a destination node address); a 6-byte field specifying a media access control-source address (MAC-SA: a source node address); a 2-byte field specifying the type of Ethernet; and a variable-length field specifying a payload.

The payload includes a Ver field that specifies version information (Ver); a Req Code field that specifies a request code (Req Code); a Request ID field that specifies a request ID (Request ID); and a Length field that specifies the length of a message stored in the payload.

For example, in the Req Code field, 0x01 indicates a request (Request), 0x02 indicates acknowledgement (Ack), 0x03 indicates a rejection (Nack), 0x04 indicates a notification of information (Info), and 0x05 indicates a notification of the cancellation (Cancel Request).

The payload includes fields each having a TLV (Type/Length/Value) format. For example, in the Type field, 1 indicates a network type. In the Value field, 0x01 indicates MPLS-VPN (L3), 0x02 indicates MPLS-VPN (L2), and 0x03 indicates PBB-TE (Provider Backbone Bridge-Traffic Engineering).

Further, when 2 is set in the Type field, the Type field indicates a packet flow identifier, and a tunnel label and a pseudo wire label are set in the Value field. When 3 is set in the Type field, the Type field indicates a shaping rate, and a shaping rate value (bps) is set in the Value field. When 4 is set in the Type field, the Type field indicates a transmission rate of a packet flow, and a transmission rate value (bps) of the packet flow is set in the Value field.

When 5 is set in the Type field, the Type field indicates a first queue length defined as a discard threshold value of a shaping queue for storing packets belonging to the target packet flow, and the discard threshold value (bytes) is set in the Value field. When 6 is set in the Type field, the Type field indicates a second queue length defined as the current length of a queue for handling packets, and the current length (bytes) of the queue is set in the Value field.

Next, examples of transmission sequences that are performed using the aforementioned packet format illustrated in FIG. 21 during a negotiation procedure will be described with reference to FIGS. 22 to 24. In the examples of transmission sequences of FIGS. 22 to 24, payload fields of messages are illustrated.

Figure 22:
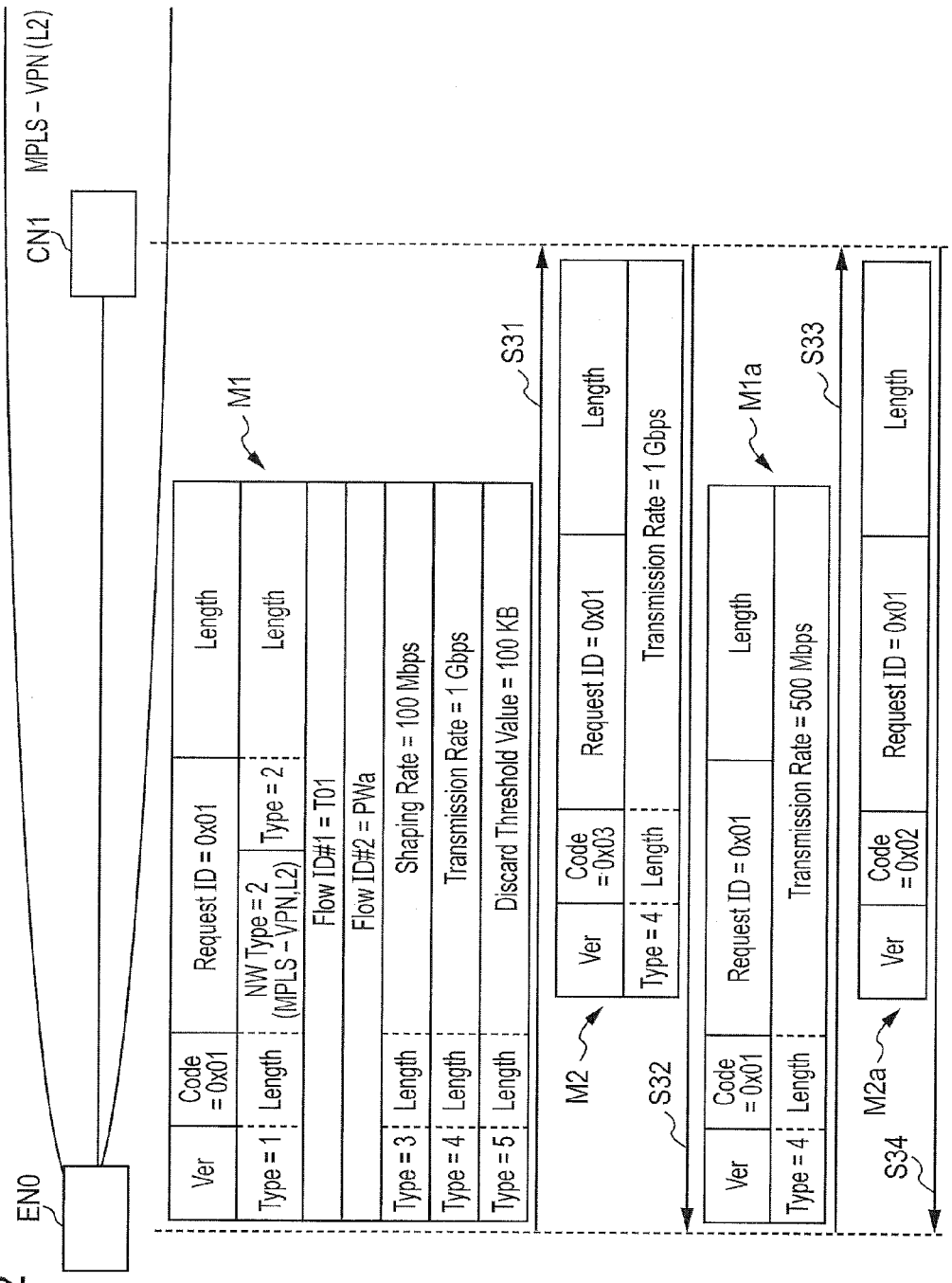
FIG. 22 is a diagram illustrating an example of a transmission sequence for transmitting a packet-shaping request message, according to an embodiment.

FIG. 22 is a diagram illustrating an example of a transmission sequence for transmitting a packet-shaping request message, according to an embodiment. FIG. 22 illustrates an example in which the node EN0 requests the node CN1 to perform packet-shaping processing on a target packet flow identified by the tunnel label T01 and the pseudo wire label PWa, at a shaping rate of 100 Mbps under the condition that the node EN0 transmits the target packet flow to node CN1 at a transmission rate of 1 Gbps and the discard threshold value of a shaping queue for storing packets belonging to the target packet flow is 100 KB.

In sequence S31, the node EN0 transmits, to the node CN1, a packet-shaping request message M1 that requests the node CN1 to perform packet-shaping processing. Parameter information included in the packet-shaping request message M1 may be set as follows.

In the packet-shaping request message M1, 0x01 is set in the Req Code field (indicating "Request"); 0x01 is set in the Request ID field; 0x02 is set in the Value field corresponding to the Type field having value 1 (indicating that the network type is MPLS-VPN (L2)); Flow ID#1=T01 and Flow ID#2=PWa are set in the Value field corresponding to the Type field having value 2; 100 (Mbps) is set in the Value field corresponding to the Type field having value 3 (indicating that the shaping rate is 100 Mbps); 1 is set in the Value field corresponding to the Type field having value 4 (indicating that the transmission rate is 1 Gbps); and 100 is set in the Value field corresponding to the Type field having value 5 (indicating that the discard threshold value is 100 KB).

In operation S32, the node CN1 transmits, to the node EN0, a rejection message M2 that indicates the node CN1 rejects requirements provided in sequence S31. Parameter information included in the rejection message M2 may be set as follows.

In the rejection message M2, 0x03 is set in the Rec Code field (indicating Nack meaning that the packet-shaping request is rejected); 0x01 is set in the Request ID field; and 1 is set in the Value field corresponding to the Type field having value 4 (indicating that the transmission rate 1 Gbps). This means that node CN1 rejects the transmission rate of 1 Gbps at which the target packet flow is transmitted from the node EN0 to the node CN1.

In sequence S33, the node EN0 changes a transmission rate from 1 Gbps to 500 Mbps, and retransmits, to the node CN1, the packet-shaping request message M1a including a transmission rate of 500 Mbps at which the target packet flow is transmitted from the node EN0 to the node CN1. Parameter information included in the request message M1a may be set as follows. In the packet-shaping request message M1a, 0x01 is set in the Req Code field (indicating "Request"); 0x01 is set in the Request ID field; and 500 is set in the Value field corresponding to the Type field having value 4 (indicating that the transmission rate is 500 Mbps).

In the above example, the packet-shaping request message M1a does not include parameters other than the transmission rate (which are previously acknowledged by the node CN1). However, the packet-shaping request message M1a may be configured to include those parameters other than the transmission rate. Here, the node CN1 may identify that the request message M1a is a packet-shaping request message that is retransmitted instead of the packet-shaping request message M1, by checking that the request messages M1 and M1a have the same Request ID.

In sequence S34, the node CN1 transmits, to the node EN0, an acknowledgement message M2 indicating that the node CN1 has acknowledged the requirements provided in sequence S33. Parameter information included in the acknowledgement message M2 may be set as follows: 0x02 is set in the Req Code field (indicating Ack meaning that the packet-shaping request message has been acknowledged by node CN1), and 0x01 is set in the Request ID field.

Figure 23:
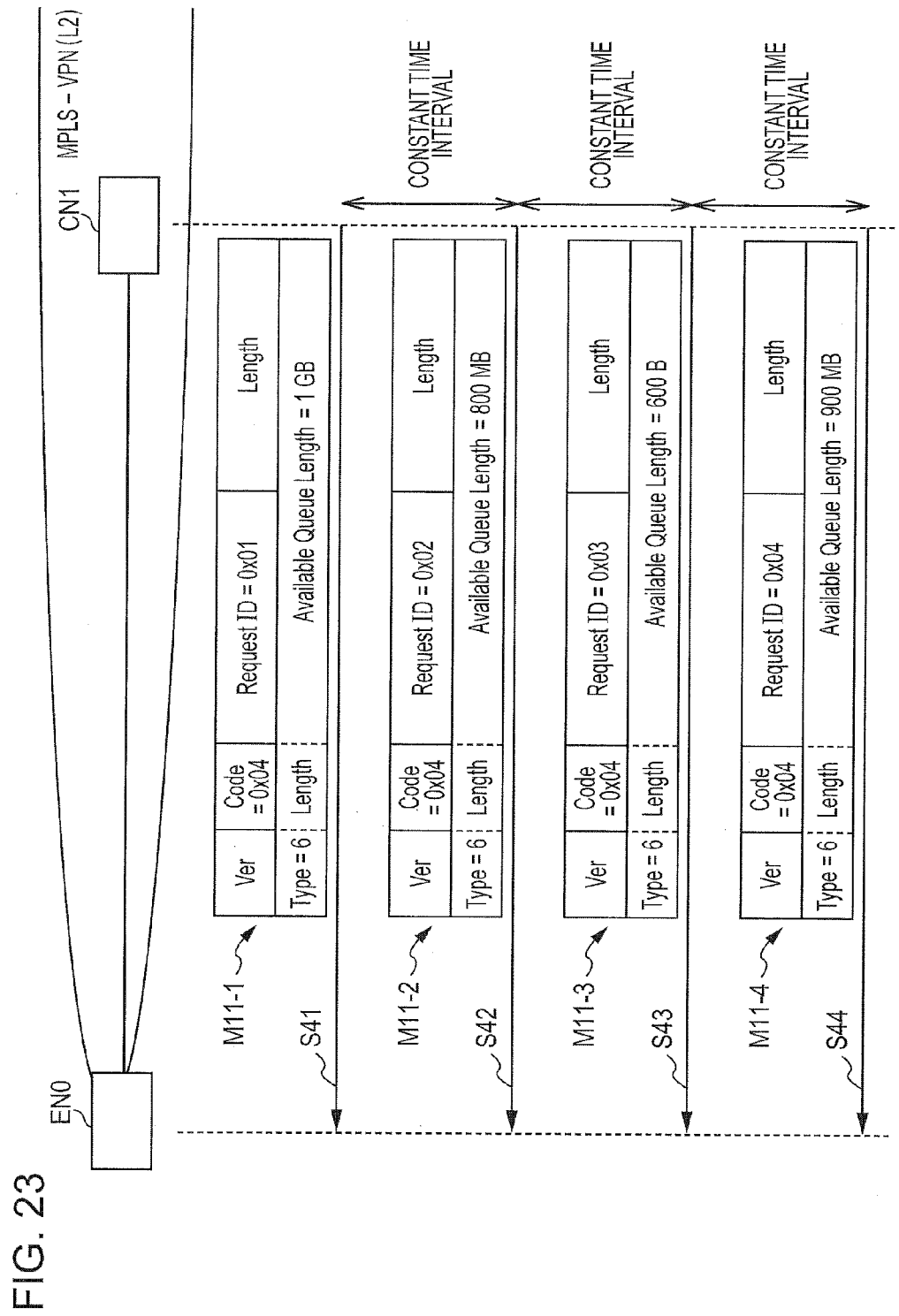
FIG. 23 is a diagram illustrating an example of a transmission sequence for advertising information on a resource-usage state of a post-processing node, according to an embodiment.

FIG. 23 is a diagram illustrating an example of a transmission sequence for advertising information on a resource-usage state of a post-processing node, according to an embodiment. FIG. 23 illustrates an example in which the core node (a post-processing node) periodically notifies the source edge node of information on a resource usage state of the buffer of the core node. In this case, 0x04 is set in the Req Code field (indicating a notification of information), and the core node notifies the source edge node of information on the current length of the queue in the core node. Every time the core node periodically notifies the source edge node of the information, the value set in the Request ID field is incremented by 1 and provided to the source edge node.

In operation S41, the node CN1 transmits, to the node EN0, a buffer-resource information message M11-1 including information on the resource usage state for the buffer of the node CN1. Parameter information included in the buffer-resource information message M11-1 may be set as follows. In the buffer resource information message M11-1, 0x04 is set in the Req Code field (indicating a notification of information); 0x01 is set in the Request ID field; and 1 is set in the Value field corresponding to the Type field having value 6 (indicating that the available queue length is 1 GB).

In sequence S42, the node CN1 transmits, to the node EN0, a buffer resource information message M11-2 including information on the resource usage state of the buffer of the node CN1 after a predetermined time period has elapsed from previously transmitting the buffer resource information message M11-1. Parameter information included in the buffer resource information message M11-2 may be set as follows. In the buffer resource information message M11-2, 0x04 is set in the Req Code (indicating a notification of information); 0x02 is set in the Request ID field; and 800 is set in the Value field corresponding to the Type field having value 6 (indicating that the available queue length is 800 MB).

In sequence S43, the node CN1 transmits, to the node EN0, a resource information message M11-3 including information on the resource usage state of the buffer of the node CN1 after a predetermined time period has elapsed from previously transmitting the buffer resource information message M11-2. Parameter information included in the buffer resource information message M11-3 may be set as follows. In the buffer resource information message M11-3, 0x04 is set in the Req Code field (indicating a notification of information); 0x03 is set in the Request ID field; and 600 is set in the Value field corresponding to the Type field having value 6 (indicating that the available queue length is 600 MB).

In operation S44, the node CN1 transmits, to the node EN0, a buffer resource information message M11-4 including information on the resource usage state of the buffer of the node CN1 after a predetermined time period has elapsed from previously transmitting the buffer resource information message M11-3. Parameter information included in the buffer resource information message M11-4 may be set as follows. In the buffer resource information message M11-4, 0x04 is set in the Req Code field (indicating a notification of information); 0x04 is set in the Request ID field; and 900 is set in the Value field corresponding to the Type field having value 6 (indicating that the available queue length is 900 MB).

Figure 24:
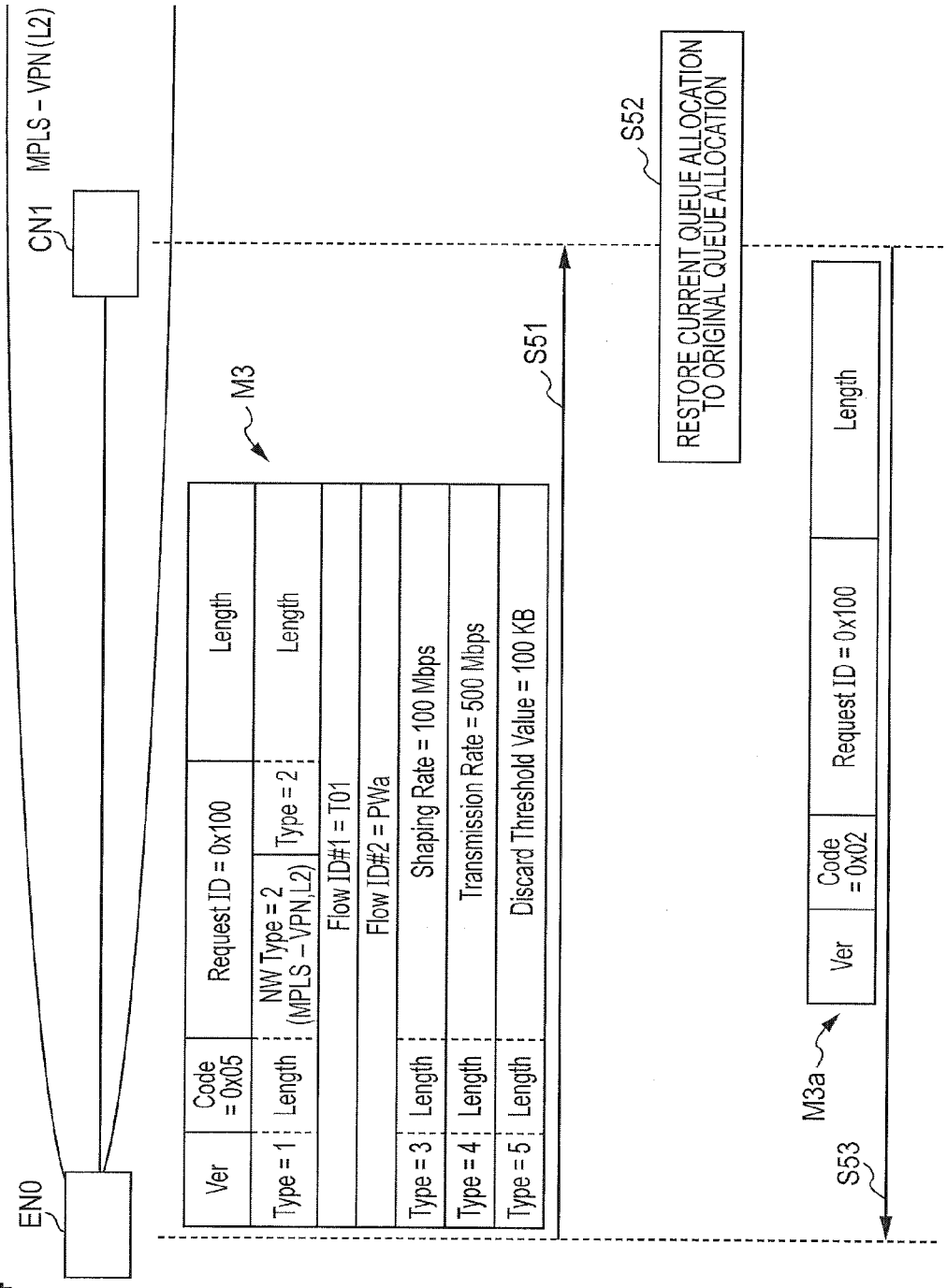
FIG. 24 is a diagram illustrating an example of a transmission sequence for cancelling a packet-shaping request message, according to an embodiment.

FIG. 24 is a diagram illustrating an example of a transmission sequence for cancelling a packet-shaping request message, according to an embodiment. FIG. 24 illustrates an example in which the node EN0 notifies the node CN1 of cancellation of the packet-shaping request message. The node EN0 sets, as parameter information, 0x05 (indicating a notification of cancellation) to the Req Code field, and sets, to the fields of the TLV format, parameters needed for cancelling the packet-shaping request. Then, the node EN0 transmits, to the node CN1, a cancel message including the parameter information. The node CN1 restores the current queue allocation to the original queue allocation, and transmits, to the node EN0, a response message in which 0x02 is set in the Req Code field (indicating acknowledgement).

In sequence S51, the node EN0 transmits, to the node CN1, a cancel message M3 indicating cancellation of the packet-shaping request message. Parameter information included in the cancel message M3 may be set as follows.

In the cancellation message M3, 0x05 is set in the Req Code field (indicating cancellation of the packet-shaping request); 0x100 is set in the Request ID field; 0x02 is set in the Value field corresponding to the Type field having value 1 (indicating that the network type is MPLS-VPN (L2)); Flow ID#1=T01 and Flow ID#2=PWa are set in the Value field corresponding to the Type field having value 2; 100 is set in the Value field corresponding to the Type field having value 3 (indicating that the shaping rate is 100 Mbps); 500 is set in the Value field corresponding to the Type field having value 4 (indicating that the transmission rate is 500 Mbps); and 100 is set in the Value field corresponding to the Type field having value 5 (indicating that the discard threshold value is 100 KB).

In sequence S52, the node CN1 restores the current queue allocation to the original queue allocation.

In sequence S53, the node CN1 transmits, to the node EN0, a response message M3a indicating that the packet-shaping request message has been cancelled. Parameter information included in the response message M3a may be set as follows. In the response message M3a, 0x02 is set in the Req Code field (indicating acknowledgement); and 0x100 is set in the Request ID field.

Next, description will be given of setting a transmission rate using an extra bandwidth. The maximum transmission rate may be set using an extra bandwidth included in a physical bandwidth of a link between the pre-processing node and the post-processing node. The maximum transmission rate is the sum of the extra bandwidth and the shaping rate of a target packet flow, where the extra bandwidth is obtained by subtracting the total of shaping rates from the physical bandwidth of the link.

Figure 25:
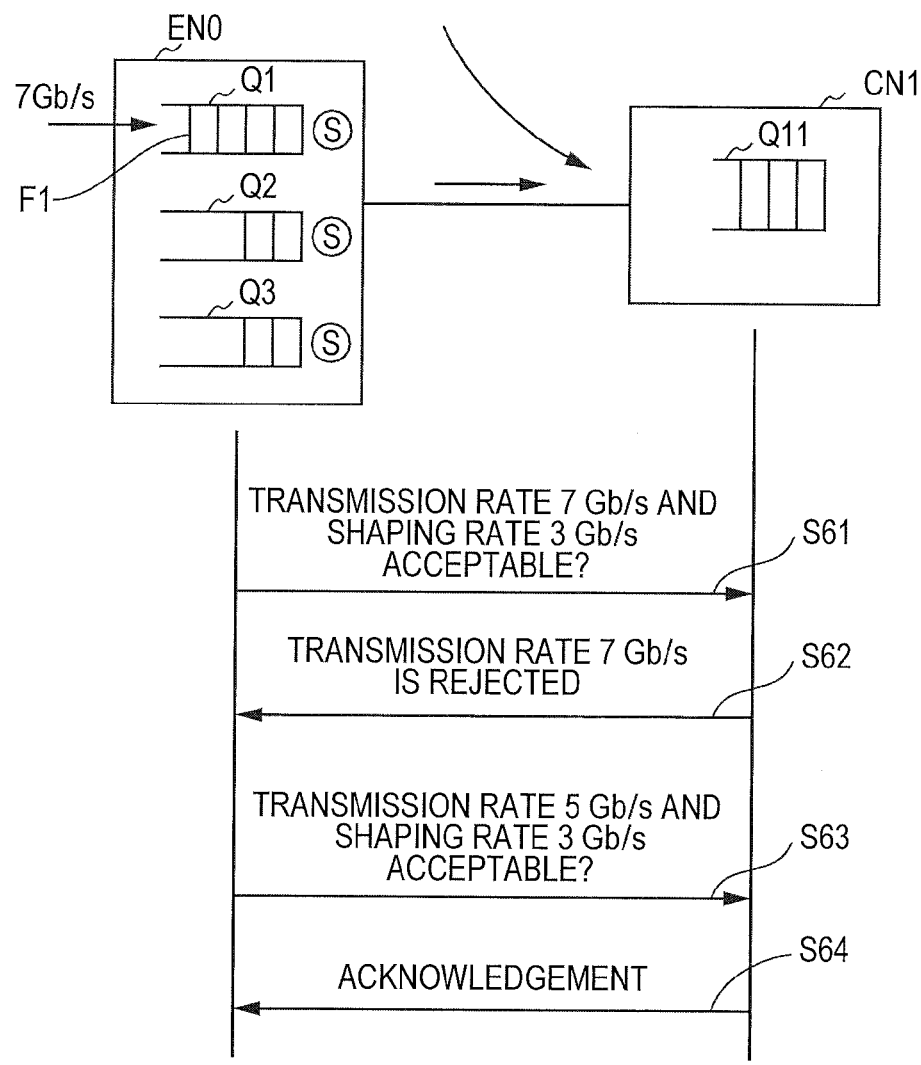
FIG. 25 is a diagram illustrating an example of a transmission sequence for performing packet-shaping processing using the maximum transmission rate, according to an embodiment.

FIG. 25 is a diagram illustrating an example of a transmission sequence for performing packet-shaping processing using the maximum transmission rate, according to an embodiment. Here, it is assumed that the physical bandwidth of the link between the node EN0 and the node CN1 is 10 Gbps. In addition, it is also assumed that a shaping rate for performing packet-shaping processing on a packet flow F1 queued in the queue Q1 of the node EN0 is 3 Gbps, a shaping rate for performing packet-shaping processing on a packet flow queued in the queue Q2 of the node EN0 is 2 Gbps, and a shaping rate for performing packet-shaping processing on a packet flow queued in the queue Q3 of the node EN0 is 1 Gbps.

When the node EN0 requests the node CN1 to perform packet-shaping processing on the target packet flow F1 queued in the queue Q1, the maximum transmission rate is obtained as follows:

(the maximum transmission rate)=(the physical bandwidth of the link)−(the total of the shaping rates)+(the shaping rate for the queue Q1)=(10 Gbps)−(3 Gbps+2 Gbps+1 Gbps)+(3 Gbps)=7 Gbps.

In operation S61, the node EN0 requests the node CN1 to perform packet-shaping processing on the packet flow F1 by transmitting a packet-shaping request message to the node CN1. In this case, it is assumed that parameter information set in the packet-shaping request message indicates that the node EN0 transmits the packet flow F1 at the maximum transmission rate of 7 Gbps and requests the node CN1 to perform packet-shaping processing on the target packet flow F1 at a shaping rate of 3 Gbps so that the shaped packets are outputted from the node N1 at the shaping rate of 3 Gbps.

In sequence S62, it is assumed that the node CN1 also receives another packet flow transmitted from a node other than the node EN0 (not depicted in FIG. 25), and determines that the total amount of the packet flows exceeds the acceptable capacity of the queue Q11 when the node EN0 transmits the packet flow F1 at a transmission rate of 7 Gbps. In this case, the node CN1 notifies the node EN0 of the fact that the node CN1 is unable to receive the target packet flow F1 at the transmission rate of 7 Gbps.

In sequence S63, the node EN0 changes the parameter information included in the packet-shaping request message so that the node EN0 transmits the target packet flow F1 at a transmission rate of 5 Gbps and the node CN1 performs the packet-shaping processing on the packet flow F1 at a shaping rate of 3 Gbps, and transmits the packet-shaping request message including the changed parameter information to the node CN1. This allows the packet-flow F1 to be outputted from the node CN1 at the shaping rate of 3 Gbps.

In sequence S64, it is assumed that the node CN1 is able to receive the target packet flow F1 at a transmission rate of 5 Gbps and to perform a packet-shaping processing on the target packet flow F1 at a shaping rate of 3 Gbps. In this case, the node CN1 transmits, in response to the packet-shaping request message received in sequence S63, a response message indicating that the node CN1 has acknowledged the packet-shaping request message received in sequence S63.

In this manner, the pre-processing node calculates the maximum transmission rate and negotiates about whether the pre-processing node is able to transmit the target packet flow at the maximum transmission rate or not. When the pre-processing node is able to transmit the target packet flow at the maximum transmission rate, it is possible to effectively use the bandwidth of the link between the pre-processing and post-processing nodes and to quickly resolve the shortage of the buffer resources of the pre-processing node.

Next, description will be given of the case in which a packet-shaping request message is transmitted using a stand-by path.

Figure 26:
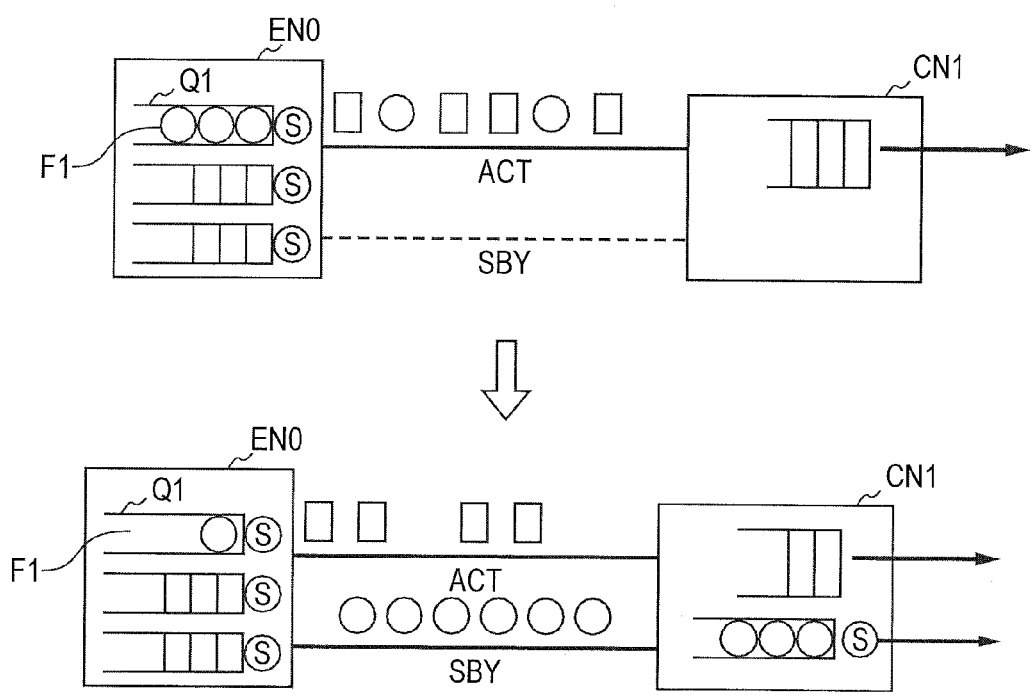
FIG. 26 is a schematic diagram illustrating an operation example for transmitting a target packet flow using a stand-by path, according to an embodiment.

FIG. 26 is a schematic diagram illustrating an operation example for transmitting a target packet flow using a stand-by path, according to an embodiment. In the example of FIG. 26, the node EN0 and the node CN1 are coupled to each other via a redundant configuration, that is, the node EN0 and the node CN1 are connected to each other via an active path (denoted by "ACT" in FIG. 26) and a stand-by path (denoted by "SBY" in FIG. 26). For example, 1:1 link aggregation method or MPLS Fast Reroute (MPLS FRR) method may be used as a redundant configuration.

In this case, after the node EN0 requests the node CN1 to perform packet-shaping processing on a target packet flow F1 queued in the queue Q1 by transmitting a packet-shaping request message to the node CN1, and the node CN1 acknowledges the packet-shaping request message, the node EN0 transmits the target packet flow F1 to the node CN1 through the stand-by path. When the stand-by path is a completely preliminary path that is not used in a normal operational state, the maximum transmission rate becomes equal to a physical link rate for the stand-by path.

When a bandwidth of the stand-by path is effectively used as mentioned above, it is possible to quickly resolve the shortage of the buffer resources of the node EN0.

As described above, according to the embodiments, the point of packet-shaping may be dynamically changed, depending on the resource usage state of the buffer, under conditions that the available buffer resources are limited. This allows queues stored in the buffer to have improved tolerance to congested traffic, thereby reducing the loss rate of packets during traffic congestion and improving the quality of communication.

The communication system that transmits and receives a packet is described above as a typical example according to the embodiments. Here, a cell, a frame or the like may also be used as a packet according to the embodiments.

In the embodiments described above, the configurations of the parts described in the embodiments may be replaced with other parts that have the same functions as the parts described in the embodiments. In addition, another arbitrary constituent part or process may be added to a communication system according to the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system for performing packet-shaping on a packet flow, the communication system comprising:
 a first transmission apparatus to:
  receive, at a first transmission rate, packets belonging to a target packet flow on which packet-shaping processing for controlling network traffic is to be performed;
  store the received packets in a first packet buffer; and
  perform first packet-shaping processing on the target packet flow by transmitting, at a second transmission rate, packets that belong to the target packet flow and are read out from the first packet buffer;
 a second transmission apparatus to:
  receive, at the second transmission rate, packets that belong to the target packet flow from the first transmission apparatus; and
  store the received packets in a second packet buffer, wherein,
  when a shortage of buffer resource available for storing packets belonging to the target packet flow occurs in the first packet buffer, the first transmission apparatus requests the second transmission apparatus to perform second packet-shaping processing on the target packet flow, by transmitting a packet-shaping request message including a third transmission rate to the second transmission apparatus; and the second transmission apparatus performs, upon receiving the packet-shaping request message, the second packet-shaping processing on the target packet flow by transmitting, at the third transmission rate, packets that belong to the target packet flow and are read out from the second packet buffer.

2. The communication system of claim 1, wherein
the second transmission apparatus negotiates the third transmission rate with the first transmission apparatus, and
the second transmission apparatus performs the second packet-shaping processing on the target packet flow by transmitting, at the third transmission rate negotiated with the first transmission apparatus, packets that belong to the target packet flow and are read out from the second packet buffer.

3. The communication system of claim 1, wherein
the packet-shaping request message further includes the second transmission rate;
the first transmission apparatus negotiates the second transmission rate with the second transmission apparatus; and
the first transmission apparatus transmits, at the second transmission rate negotiated with the second transmission apparatus, packets that belong to the target packet flow and are read out from the first packet buffer, to the second transmission apparatus.

4. The communication system of claim 1, wherein
the packet-shaping request message further includes a discard threshold value indicating a maximum size of buffer space that is allowed to be used for storing packets belonging to the target packet flow in the second packet buffer;
the first transmission apparatus negotiates the discard threshold value with the second transmission apparatus; and
the second transmission apparatus performs the second packet-shaping processing on the target packet flow using the discard threshold value negotiated with the first transmission apparatus.

5. The communication system of claim 1, wherein
a plurality of the second transmission apparatuses are communicably coupled with the first transmission apparatus;
each of the plurality of the second transmission apparatuses notifies the first transmission apparatus of a resource usage state of the second packet buffer provided for the each of the plurality of the second transmission apparatuses;
the first transmission apparatus selects, from among the plurality of the second transmission apparatuses, the second transmission apparatus to which the packet-shaping request message is to be transmitted, based on the resource usage states notified by the plurality of the second transmission apparatuses; and
the first transmission apparatus requests the selected second transmission apparatus to perform the second packet-shaping processing on the target packet flow, by transmitting the packet-shaping request message including the third transmission rate to the selected second transmission apparatus.

6. The communication system of claim 1, wherein
the first transmission apparatus request the second transmission apparatus to cancel the packet-shaping request message that was previously transmitted from the first transmission apparatus when the shortage of the buffer resource of the first packet buffer has recovered.

7. The communication system of claim 1, wherein
the first transmission apparatus transmits packets that belong to the target packet flow and are read out from the first packet buffer, to the second transmission apparatus at a fourth transmission rate obtained by adding the second transmission rate to an extra bandwidth of a physical link between the first and second transmission apparatuses.

8. The communication system of claim 1, wherein
the first and second transmission apparatuses are communicably coupled with each other via redundant communication paths including an active path and a stand-by path; and
the first transmission apparatus transmits packets that belong to the target packet flow and are read out from the first packet buffer, via the standby path to the second transmission apparatus.

9. A transmission apparatus for performing packet-shaping on a packet flow, the transmission apparatus comprising:
a memory to store packets belonging to a target packet flow on which packet-shaping processing for controlling network traffic is to be performed; and
a processor to:
receive, at a first transmission rate, packets belonging to the target packet flow;
perform the packet-shaping processing on the target packet flow by transmitting, at a second transmission rate, packets that belong to the target packet flow and are read out from the memory, wherein,
when a shortage of buffer resource available for storing packets belonging to the target packet flow occurs in the memory, the processor request another transmission apparatus to perform the packet-shaping processing on the target packet flow, by transmitting a packet-shaping request message including a third transmission rate to the another transmission apparatus so that the another transmission apparatus performs the second packet-shaping processing on the target packet flow by transmitting, at the third transmission rate, packets belonging to the target packet flow.

10. A transmission apparatus for performing packet-shaping on a packet flow, the transmission apparatus comprising:
a memory to store packets that arrive at the transmission apparatus; and
a processor to:
receive, from another transmission apparatus, a packet-shaping request message for performing packet shaping processing on a target packet flow;
allocate, in the memory, a shaping buffer for storing packets belonging to the target packet flow;
receive, at a first transmission rate, packets belonging to the target packet flow from the another transmission apparatus;
store the received packets belonging to the target packet flow in the shaping buffer; and
perform the packet shaping processing on the target packet flow by transmitting, at a second transmission rate, packets that are read out from the shaping buffer;
receive, from the another transmission apparatus, a cancel message indicating a cancellation of the packet-shaping request message that was previously received from the another transmission apparatus;

check a length of a shaping queue in the shaping buffer storing packets belonging to the target packet flow on which the packet-shaping is being performed;

when the shaping queue is empty, restore a queue allocation to an original queue allocation by returning a buffer space used for the shaping buffer to the memory; and when the shaping queue is not empty, wait until the shaping queue becomes empty and then restore a queue allocation to an original queue allocation by returning a buffer space used for the shaping buffer to the memory.

* * * * *